(12) United States Patent
Maegawa et al.

(10) Patent No.: US 8,663,839 B2
(45) Date of Patent: Mar. 4, 2014

(54) ELECTRODE BINDER COMPOSITION, ELECTRODE SLURRY, ELECTRODE, AND ELECTRICAL STORAGE DEVICE

(71) Applicant: JSR Corporation, Tokyo (JP)

(72) Inventors: Maki Maegawa, Minato-ku (JP); Tatsuaki Honda, Minato-ku (JP); Tatsuya Abe, Minato-ku (JP); Hiroyuki Miyauchi, Minato-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 13/766,089

(22) Filed: Feb. 13, 2013

(65) Prior Publication Data
US 2013/0209875 A1    Aug. 15, 2013

(30) Foreign Application Priority Data
Feb. 13, 2012  (JP) ................................ 2012-028443

(51) Int. Cl.
*H01M 4/13* (2010.01)
*H01M 4/62* (2006.01)

(52) U.S. Cl.
USPC ........................................ 429/217; 429/209

(58) Field of Classification Search
USPC ............................ 429/217; 524/462, 463, 556
See application file for complete search history.

(56) References Cited

U.S. PATENT DOCUMENTS

| | | | |
|---|---|---|---|
| 7,351,498 B2 | 4/2008 | Watarai et al. | |
| 2002/0168569 A1 | 11/2002 | Barriere et al. | |
| 2005/0095504 A1 | 5/2005 | Kim et al. | |
| 2009/0104428 A1* | 4/2009 | Chung et al. | 428/318.6 |
| 2009/0239147 A1 | 9/2009 | Itou et al. | |

(Continued)

FOREIGN PATENT DOCUMENTS

| CN | A1378298 | 11/2002 |
|---|---|---|
| CN | 1529917 A | 9/2004 |

(Continued)

OTHER PUBLICATIONS

U.S. Appl. No. 13/599,288, filed Aug. 30, 2012, Kitaguchi, et al.

(Continued)

*Primary Examiner* — Ula C Ruddock
*Assistant Examiner* — Scott J Chmielecki
(74) *Attorney, Agent, or Firm* — Oblon, Spivak, McClelland, Maier & Neustadt, L.L.P.

(57) ABSTRACT

An electrode binder composition is used to produce an electrode used for an electrical storage device, and includes (A) a polymer, (B) a compound represented by the following general formula (1), and (C) a liquid medium, the polymer (A) being fluorine-containing polymer particles or diene polymer particles, and a concentration of the compound (B) in the electrode binder composition being 5 to 500 ppm.

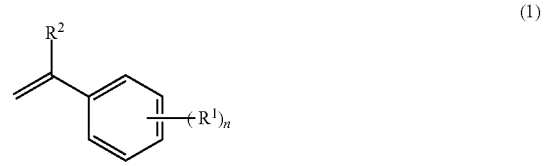

(1)

wherein $R^1$ and $R^2$ independently represent a hydrogen atom, a halogen atom, or a monovalent alkyl group, and n is an integer from 0 to 5.

6 Claims, 1 Drawing Sheet

(56) References Cited

U.S. PATENT DOCUMENTS

| | | | |
|---|---|---|---|
| 2010/0112441 A1* | 5/2010 | Fukumine et al. | 429/217 |
| 2010/0173196 A1 | 7/2010 | Itou et al. | |
| 2012/0123031 A1 | 5/2012 | Ishikawa et al. | |

FOREIGN PATENT DOCUMENTS

| | | |
|---|---|---|
| CN | A101379131 | 3/2009 |
| JP | 2000-299109 | 10/2000 |
| JP | 2002-042819 | 2/2002 |
| JP | 2002-319402 | 10/2002 |
| JP | 2003-263987 | 9/2003 |
| JP | 2010-055847 | 3/2010 |
| JP | 2011-003529 | 1/2011 |
| JP | 4849286 | 10/2011 |
| TW | A201219458 | 5/2012 |

OTHER PUBLICATIONS

Extended European Search Report issued Apr. 15, 2013, in Patent Application No. 13152624.6.

* cited by examiner

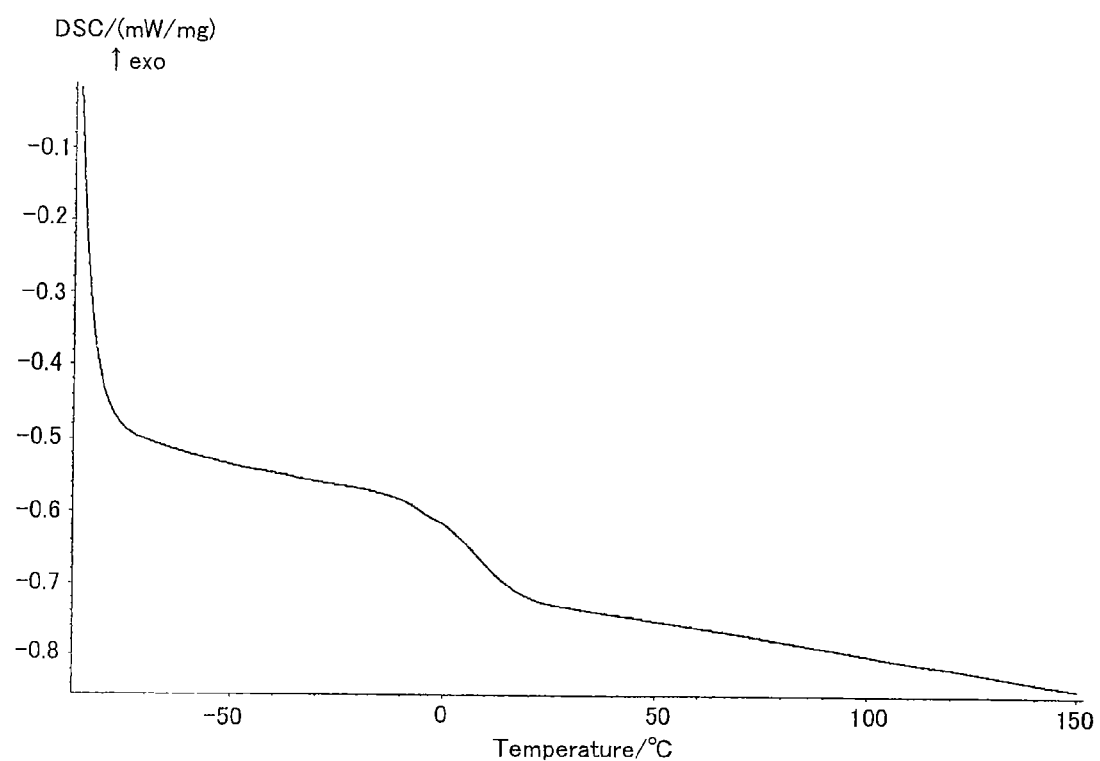

ELECTRODE BINDER COMPOSITION, ELECTRODE SLURRY, ELECTRODE, AND ELECTRICAL STORAGE DEVICE

Japanese Patent Application No. 2012-28443 filed on Feb. 13, 2012, is hereby incorporated by reference in its entirety.

BACKGROUND OF THE INVENTION

The present invention relates to an electrode binder composition, an electrode slurry that includes the binder composition and an electrode active material, an electrode that is produced by applying the slurry to a collector, and drying the slurry, and an electrical storage device that includes the electrode.

In recent years, a high-voltage electrical storage device having a high energy density has been desired as a power supply for driving an electronic instrument. In particular, a lithium-ion battery or a lithium-ion capacitor is expected to be a high-voltage electrical storage device having a high energy density.

An electrode used for such an electrical storage device is produced by applying a mixture of an electrode active material and polymer particles that function as a binder to the surface of a collector, and drying the mixture. The polymer particles are required to exhibit a capability of binding the electrode active material, a capability of binding the electrode active material and the collector, scratch resistance when winding the electrode, and powder fall resistance (i.e., a fine powder of the electrode active material or the like does not occur from an electrode composition layer (hereinafter may be referred to as "electrode active material layer") due to cutting or the like). If the polymer particles satisfy these properties, it is possible to produce an electrical storage device that has high flexibility in structural design (e.g., an electrode folding method or an electrode winding radius), and can be reduced in size. It was found that a capability of binding the electrode active material, a capability of binding the electrode active material and the collector, and the powder fall resistance have an almost proportional relationship. Therefore, these properties may be comprehensively referred to as "adhesion".

When producing a positive electrode, it is advantageous to use a fluorine-containing organic polymer (e.g., polyvinylidene fluoride) that exhibits slightly poor adhesion, but exhibits excellent oxidation resistance. When producing a negative electrode, it is advantageous to use a (meth)acrylic acid polymer that exhibits slightly poor oxidation resistance, but exhibits excellent adhesion.

Various techniques have been studied and proposed in order to improve the properties (e.g., oxidation resistance and adhesion) of a polymer that is used for the electrode binder. For example, JP-A-2011-3529 proposes a technique that provides a negative electrode binder with oxidation resistance and adhesion by utilizing polyvinylidene fluoride and a rubber polymer in combination. JP-A-2010-55847 proposes a technique that improves adhesion by dissolving polyvinylidene fluoride in a specific organic solvent, applying the solution to the surface of a collector, and removing the organic solvent at a low temperature. JP-A-2002-42819 proposes a technique that improves adhesion by utilizing an electrode binder having a structure that includes a main chain formed of a vinylidene fluoride copolymer and a side chain that includes a fluorine atom.

A technique that improves the above properties by controlling the composition of a binder (see JP-A-2000-299109), and a technique that improves the above properties by controlling the amount of 2,4-diphenyl-4-methyl-1-pentene that remains in particles when polymerizing latex (see JP-A-2002-319402), have also been proposed.

SUMMARY

The negative electrode binder disclosed in JP-A-2011-3529 that utilizes a fluorine-containing organic polymer and a rubber polymer exhibits improved adhesion, but the oxidation resistance of the organic polymer deteriorates to a large extent. Therefore, an electrical storage device produced using the negative electrode binder has a problem in that the charge-discharge characteristics irreversibly deteriorate due to repeated charge-discharge cycles. The electrode binder disclosed in JP-A-2010-55847 or JP-A-2002-42819 that utilizes only a fluorine-containing organic polymer cannot achieve sufficient adhesion.

The binder composition disclosed in JP-A-2000-299109 or JP-A-2002+319402 exhibits improved adhesion. However, it is difficult to maintain good charge-discharge characteristics for a long time since the binder that adheres to the electrode active material functions as a resistance component of the electrode.

These electrode binder compositions are merely evaluated in terms of the properties of an electrical storage device, and the storage stability of the electrode binder compositions that is important for practical use has not been studied.

The invention may solve the above problems, and may provide an electrode binder composition that exhibits excellent storage stability, and can produce an electrode that exhibits excellent adhesion and charge-discharge characteristics.

The invention may be implemented by the following application examples.

APPLICATION EXAMPLE 1

According to one embodiment of the invention, there is provided an electrode binder composition that is used to produce an electrode used for an electrical storage device, the binder composition including (A) a polymer (hereinafter may be referred to as "polymer (A)"), (B) a compound represented by a general formula (1) (hereinafter may be referred to as "compound (B)"), and (C) a liquid medium (hereinafter may be referred to as "liquid medium (C)"), the polymer (A) being fluorine-containing polymer particles that include (Ma) a repeating unit derived from a fluorine-containing ethylene-based monomer, and (Mb) a repeating unit derived from an unsaturated carboxylic acid ester, and a concentration of the compound (B) in the electrode binder composition being 5 to 500 ppm,

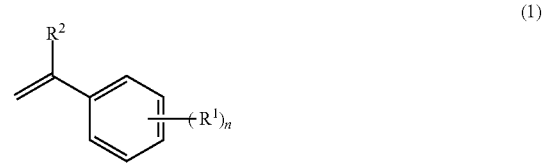

(1)

wherein $R^1$ and $R^2$ independently represent a hydrogen atom, a halogen atom, or a monovalent alkyl group, and n is an integer from 0 to 5.

APPLICATION EXAMPLE 2

In the electrode binder composition according to Application Example 1, the fluorine-containing polymer particles may have only one endothermic peak within a temperature range of −50 to +250° C. when subjected to differential scanning calorimetry (DSC) in accordance with JIS K 7121.

APPLICATION EXAMPLE 3

In the electrode binder composition according to Application Example 2, the fluorine-containing polymer particles may have the only one endothermic peak within a temperature range of −30 to +30° C.

APPLICATION EXAMPLE 4

In the electrode binder composition according to Application Examples 1, the fluorine-containing polymer particles may have a number average particle size of 50 to 400 nm.

APPLICATION EXAMPLE 5

According to another embodiment of the invention, there is provided an electrode binder composition that is used to produce an electrode used for an electrical storage device, the binder composition including (A) a polymer (hereinafter may be referred to as "polymer (A)"), (B) a compound represented by a general formula (1) (hereinafter may be referred to as "compound (B)"), and (C) a liquid medium (hereinafter may be referred to as "liquid medium (C)"), the polymer (A) being diene polymer particles that include (Mc) a repeating unit derived from a conjugated diene compound, (Md) a repeating unit derived from an aromatic vinyl compound, (Me) a repeating unit derived from a (meth)acrylate compound, and (Mf) a repeating unit derived from an unsaturated carboxylic acid, and a concentration of the compound (B) in the binder composition being 5 to 500 ppm,

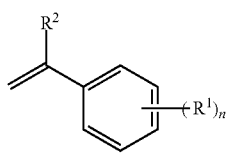

(1)

wherein $R^1$ and $R^2$ independently represent a hydrogen atom, a halogen atom, or a monovalent alkyl group, and n is an integer from 0 to 5.

APPLICATION EXAMPLE 6

In the electrode binder composition according to Application Example 5, the diene polymer particles may have only one endothermic peak within a temperature range of −50 to +5° C. when subjected to differential scanning calorimetry (DSC) in accordance with JIS K 7121.

APPLICATION EXAMPLE 7

In the electrode binder composition according to Application Example 5, the diene polymer particles may have a number average particle size of 50 to 400 nm.

APPLICATION EXAMPLE 8

According to another embodiment of the invention, there is provided an electrode slurry including the electrode binder composition according to Application Example 1, and an electrode active material.

APPLICATION EXAMPLE 9

According to another embodiment of the invention, there is provided an electrode slurry including the electrode binder composition according to Application Examples 5, and an electrode active material.

APPLICATION EXAMPLE 10

According to another embodiment of the invention, there is provided an electrode including a collector, and a layer that is formed by applying the electrode slurry according to Application Example 8 to a surface of the collector, and drying the slurry.

APPLICATION EXAMPLE 11

According to another embodiment of the invention, there is provided an electrode including a collector, and a layer that is formed by applying the electrode slurry according to Application Example 9 to a surface of the collector, and drying the slurry.

APPLICATION EXAMPLE 12

According to another embodiment of the invention, there is provided an electrical storage device including the electrode according to Application Example 10.

APPLICATION EXAMPLE 13

According to another embodiment of the invention, there is provided an electrical storage device including the electrode according to Application Example 11.

The electrode binder composition exhibits excellent storage stability, and can produce an electrode that exhibits excellent adhesion and excellent charge-discharge characteristics. An electrical storage device that includes an electrode that is produced using the electrode binder composition has excellent charge-discharge rate characteristics (i.e., electrical characteristics).

BRIEF DESCRIPTION OF THE SEVERAL VIEWS OF THE DRAWING

FIG. 1 illustrates the DSC chart of the polymer particles obtained in Example 3.

DETAILED DESCRIPTION OF THE EMBODIMENT

Exemplary embodiments of the invention are described in detail below. Note that the invention is not limited to the following exemplary embodiments. It is intended that the invention includes various modifications that may be practiced without departing from the scope of the invention. The term "(meth)acrylic acid" used herein refers to "acrylic acid" and "methacrylic acid". The term "(meth)acrylate" used herein refers to "acrylate" and "methacrylate".

1. ELECTRODE BINDER COMPOSITION

An electrode binder composition according to one embodiment of the invention is used to produce an electrode used for an electrical storage device, and includes (A) a polymer (hereinafter may be referred to as "polymer (A)"), (B) a compound represented by the following general formula (1)

(hereinafter may be referred to as "compound (B)"), and (C) a liquid medium (hereinafter may be referred to as "liquid medium (C)"), the concentration of the compound (B) in the electrode binder composition being 5 to 500 ppm.

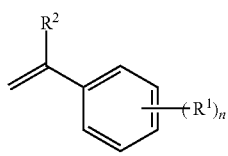

(1)

wherein $R^1$ and $R^2$ independently represent a hydrogen atom, a halogen atom, or a monovalent alkyl group, and n is an integer from 0 to 5.

Each component of the electrode binder composition according to one embodiment of the invention is described in detail below.

1.1. Polymer (A)

It is preferable that the polymer (A) included in the electrode binder composition according to one embodiment of the invention be dispersed in the liquid medium (C) in the form of particles (i.e., latex). When the electrode binder composition is a latex, an electrode slurry prepared by mixing the electrode binder composition with an electrode active material exhibits good stability and excellent applicability to a collector. The polymer (A) that is dispersed in the liquid medium (C) in the form of particles is hereinafter referred to as "polymer particles (A)".

Commercially available latex particles may be used as the polymer particles (A). When using the electrode binder composition according to one embodiment of the invention to produce a positive electrode, it is preferable that the polymer particles (A) be fluorine-containing polymer particles. When using the electrode binder composition according to one embodiment of the invention to produce a negative electrode, it is preferable that the polymer particles (A) be diene polymer particles.

1.1.1. Fluorine-Containing Polymer Particles

When using the electrode binder composition according to one embodiment of the invention to produce a positive electrode, it is preferable that the polymer particles (A) be fluorine-containing polymer particles that include (Ma) a repeating unit derived from a fluorine-containing ethylene-based monomer, and (Mb) a repeating unit derived from an unsaturated carboxylic acid ester. It is preferable that the fluorine-containing polymer particles be polymer alloy particles that include (Aa) a polymer that includes the repeating unit (Ma) derived from a fluorine-containing ethylene-based monomer, and (Ab) a polymer that includes the repeating unit (Mb) derived from an unsaturated carboxylic acid ester.

The term "polymer alloy" is defined in *Iwanami Rikagaku Jiten* (5th ed., Iwanami Shoten, Publishers) as "a general name of multi-component polymers that are obtained by mixing or chemically bonding two or more polymers". The term "polymer alloy" defined in *Iwanami Rikagaku Jiten* refers to "a polymer blend in which different polymers are physically mixed, a block or graft copolymer in which different polymer components are covalently bonded, a polymer complex in which different polymers are associated due to an intermolecular force, an interpenetrating polymer network (IPN) in which different polymers are entangled, and the like". Note that the polymer alloy particles included in the electrode binder composition are formed of an interpenetrating polymer network (IPN) in which different polymer components are not covalently bonded.

When the fluorine-containing polymer particles are polymer alloy particles, it is considered that hard segments formed of a crystalline resin aggregate in the polymer (Aa) that includes the repeating unit (Ma) derived from a fluorine-containing ethylene-based monomer to form a pseudo crosslinking point (e.g., C—H . . . F—C) in the main chain. Therefore, when the polymer (Aa) is used alone as the binder resin, the binder resin exhibits insufficient adhesion and flexibility in spite of excellent oxidation resistance. On the other hand, the polymer (Ab) that includes the repeating unit (Mb) derived from an unsaturated carboxylic acid ester exhibits excellent adhesion and flexibility, but exhibits poor oxidation resistance. Therefore, when the polymer (Ab) is used alone as the binder resin when forming a positive electrode, oxidative decomposition occurs due to repeated charge-discharge cycles, and excellent charge-discharge characteristics may not be obtained.

It was found that a positive electrode that exhibits oxidation resistance and adhesion at the same time while exhibiting excellent charge-discharge characteristics can be produced using polymer alloy particles that include the polymer (Aa) and the polymer (Ab). Note that the oxidation resistance can be further improved when the polymer alloy particles include the polymer (Aa) and the polymer (Ab).

1.1.1.1. Repeating Unit (Ma) Derived from Fluorine-Containing Ethylene-Based Monomer The fluorine-containing polymer particles include the repeating unit (Ma) derived from a fluorine-containing ethylene-based monomer. Examples of the fluorine-containing ethylene-based monomer include fluorine-containing olefin compounds, fluorine-containing (meth)acrylate compounds, and the like. Examples of the fluorine-containing olefin compounds include vinylidene fluoride, tetrafluoroethylene, hexafluoropropylene, ethylene chloride trifluoride, perfluoroalkyl vinyl ethers, and the like. Examples of the fluorine-containing (meth)acrylate compounds include a compound represented by the following general formula (2), [4[1-trifluoromethyl-2,2-bis[bis(trifluoromethyl)fluoromethyl]ethynyloxy]benzoxy]2-hydroxypropyl (meth)acrylate, and the like.

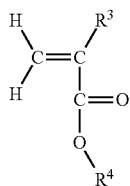

(2)

wherein $R^3$ represents a hydrogen atom or a methyl group, and $R^4$ represents a fluorine-containing hydrocarbon group having 1 to 18 carbon atoms.

Examples of the fluorine-containing hydrocarbon group having 1 to 18 carbon atoms represented by $R^4$ in the general formula (2) include fluoroalkyl groups having 1 to 12 carbon atoms, fluoroaryl groups having 6 to 16 carbon atoms, fluoroaralkyl groups having 7 to 18 carbon atoms, and the like. It is preferable that $R^4$ represent a fluoroalkyl group having 1 to 12 carbon atoms. Specific examples of a preferable fluorine-containing hydrocarbon group having 1 to 18 carbon atoms represented by $r^4$ in the general formula (2) include a 2,2,2- trifluoroethyl group, a 2,2,3,3,3-pentafluoropropyl group, a 1,1,1,3,3,3-hexafluoropropan-2-yl group, a beta-(perfluorooctyl)ethyl group, a 2,2,3,3-tetrafluoropropyl group, a 2,2,3,4,4,4-hexafluorobutyl group, a 1h,1h,5h-octafluoropentyl group, a 1h,1h,9h-perfluoro-1-nonyl group, a 1h,1h,11h-perfluoroundecyl group, a perfluorooctyl group, and the like.

The fluorine-containing ethylene-based monomer is preferably a fluorine-containing olefin compound, and more preferably at least one compound selected from the group consisting of vinylidene fluoride, tetrafluoroethylene, and hexafluoropropylene. These fluorine-containing ethylene-based monomers may be used either alone or in combination.

A fluoropolymer component that includes the repeating unit (Ma) derived from a fluorine-containing ethylene-based monomer is generally considered to exhibit excellent oxidation resistance, and may be used for a positive electrode binder composition. However, such a fluoropolymer component exhibits poor adhesion. Therefore, various attempts have been made to improve the adhesion of a fluoropolymer through modification. For example, an attempt has been made to improve the adhesion of a fluoropolymer by introducing a functional group into the polymer chain. However, this attempt is difficult to achieve since it requires accurately controlling the polymer synthesis conditions.

It was found that excellent adhesion can be obtained while maintaining sufficient oxidation resistance by utilizing fluorine-containing polymer particles that include the repeating unit (Ma) derived from a fluorine-containing ethylene-based monomer, and the repeating unit (Mb) derived from an unsaturated carboxylic acid ester. Excellent adhesion can be obtained while more effectively preventing a deterioration in oxidation resistance when the fluorine-containing polymer particles are polymer alloy particles that include the polymer (Aa) that includes the repeating unit (Ma) derived from a fluorine-containing ethylene-based monomer, and the polymer (Ab) that includes the repeating unit (Mb) derived from an unsaturated carboxylic acid ester.

When the fluorine-containing polymer particles are polymer alloy particles, the polymer (Aa) may include only the repeating unit (Ma) derived from a fluorine-containing ethylene-based monomer, or may also include a repeating unit derived from an additional copolymerizable unsaturated monomer in addition to the repeating unit (Ma) derived from a fluorine-containing ethylene-based monomer. Examples of the additional unsaturated monomer include alkyl esters of unsaturated carboxylic acids, cycloalkyl esters of unsaturated carboxylic acids, hydrophilic monomers, halogenated olefins, crosslinkable monomers, alpha-olefins, hydroxyl group-containing compounds (excluding hydroxyl group-containing compounds that fall under the hydrophilic monomers and the crosslinkable monomers), and the like. The additional unsaturated monomer may be one or more compounds selected from these compounds.

Examples of the alkyl esters of unsaturated carboxylic acids include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, 2-ethylhexyl (meth)acrylate, n-octyl (meth)acrylate, nonyl (meth)acrylate, decyl (meth)acrylate, and the like. Examples of the cycloalkyl esters of unsaturated carboxylic acids include cyclohexyl (meth)acrylate and the like. These compounds may be used either alone or in combination.

Examples of the hydrophilic monomers include unsaturated carboxylic acids, hydroxyalkyl esters of unsaturated carboxylic acids, polyhydric alcohol esters of unsaturated carboxylic acids, alpha,beta-unsaturated nitrile compounds, hydroxyl group-containing compounds, and the like. Examples of the unsaturated carboxylic acids include (meth)acrylic acid, crotonic acid, maleic acid, fumaric acid, itaconic acid, and the like. Examples of the hydroxyalkyl esters of unsaturated carboxylic acids include hydroxymethyl (meth)acrylate, hydroxyethyl (meth)acrylate, and the like. Examples of the polyhydric alcohol esters of unsaturated carboxylic acids include ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, and the like. Examples of the alpha,beta-unsaturated nitrile compounds include acrylonitrile, methacrylonitrile, alpha-chloroacrylonitrile, alpha-ethylacrylonitrile, vinylidene cyanide, and the like. Examples of the hydroxyl group-containing compounds include p-hydroxystyrene and the like. These compounds may be used either alone or in combination.

The dispersion stability of the electrode slurry used to produce an electrode active material layer is improved when the polymer (Aa) includes a structural unit derived from an unsaturated carboxylic acid. This makes it possible to produce a uniform (homogenous) electrode active material layer in which the electrode active material and the fluorine-containing polymer particles are evenly distributed. As a result, the electrode active material layer exhibits uniform strength and uniform electrical properties. Therefore, it is possible to effectively prevent a situation in which the electrode active material layer is locally removed from the current collector, or the electrode deteriorates due to local potential concentration caused by uneven distribution of the electrode active material or the binder.

The content of the repeating unit (Ma) derived from a fluorine-containing ethylene-based monomer in the polymer (Aa) is preferably 80 mass % or more, and more preferably 90 mass % or more, based on the total mass of the polymer (Aa).

The content of a repeating unit derived from vinylidene fluoride in the polymer (Aa) is preferably 50 to 99 mass %, and more preferably 80 to 98 mass %. The content of a repeating unit derived from tetrafluoroethylene in the polymer (Aa) is preferably 1 to 50 mass %, and more preferably 2 to 20 mass %. The content of a repeating unit derived from hexafluoropropylene in the polymer (Aa) is preferably 1 to 50 mass %, and more preferably 2 to 20 mass %.

The polymer (Aa) may be easily produced by subjecting the fluorine-containing ethylene-based monomer and an optional additional unsaturated monomer to emulsion polymerization according to a known method.

1.1.1.2. Repeating Unit (Mb) Derived from Unsaturated Carboxylic Acid Ester

The fluorine-containing polymer particles include the repeating unit (Mb) derived from an unsaturated carboxylic acid ester. A polymer includes a repeating unit derived from an unsaturated carboxylic acid ester has not been used to produce a positive electrode since such a polymer has been considered to exhibit poor oxidation resistance in spite of excellent adhesion. It was found that sufficient oxidation resistance can be obtained while maintaining excellent adhesion by utilizing fluorine-containing polymer particles that include the repeating unit (Ma) derived from a fluorine-containing ethylene-based monomer, and the repeating unit (Mb) derived from an unsaturated carboxylic acid ester.

The unsaturated carboxylic acid ester is preferably a (meth)acrylate compound. Specific examples of the (meth)acrylate compound include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)

acrylate, cyclohexyl (meth)acrylate, 2-ethylhexyl (meth) acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like. The (meth)acrylate compound may be one or more compounds selected from these compounds. It is preferable to use one or more (meth)acrylate compounds selected from methyl (meth)acrylate, ethyl (meth)acrylate, and 2-ethylhexyl (meth)acrylate. It is particularly preferable to use methyl (meth)acrylate.

When the fluorine-containing polymer particles are polymer alloy particles, the polymer (Ab) may include only the repeating unit (Mb) derived from an unsaturated carboxylic acid ester, or may include a structural unit derived from an additional copolymerizable unsaturated monomer in addition to the repeating unit (Mb) derived from an unsaturated carboxylic acid ester.

The content of the repeating unit (Mb) derived from an unsaturated carboxylic acid ester in the polymer (Ab) is preferably 65 mass % or more, and more preferably 75 mass % or more, based on the total mass of the polymer (Ab).

Examples of the additional unsaturated monomer include alpha,beta-unsaturated nitrile compounds, unsaturated carboxylic acids, conjugated diene compounds, aromatic vinyl compounds, and the like.

1.1.1.3. Preparation of Fluorine-Containing Polymer Particles

The fluorine-containing polymer particles may be synthesized by an arbitrary method as long as the resulting fluorine-containing polymer particles have the above configuration and properties. For example, the fluorine-containing polymer particles may easily be synthesized by a known emulsion polymerization method or a combination of known emulsion polymerization methods.

For example, the polymer (Aa) that includes the repeating unit (Ma) derived from a fluorine-containing ethylene-based monomer is synthesized by a known method. The monomers used to produce the polymer (Ab) are added to the polymer (Aa), and sufficiently absorbed in the network structure of the polymer (Aa). The monomers are then polymerized in the network structure of the polymer (Aa) to synthesize the polymer (Ab). The fluorine-containing polymer particles can thus be easily produced. When producing the polymer alloy particles by the above method, the monomers that are used to produce the polymer (Ab) must be sufficiently absorbed in the polymer (Aa). If the absorption temperature is too low, or the absorption time is too short, core-shell particles or particles in which part of the surface layer has an IPN structure may be produced (i.e., the fluorine-containing polymer particles used in the invention may not be obtained). If the absorption temperature is too high, the pressure in the polymerization system may increase to a large extent, resulting in difficulties in handling the reaction system and controlling the reaction. Even if the absorption time is increased to a large extent, further advantageous results may not be obtained.

The absorption temperature is preferably 30 to 100° C., and more preferably 40 to 80° C. The absorption time is preferably 1 to 12 hours, and more preferably 2 to 8 hours. When the absorption temperature is low, it is preferable to increase the absorption time. When the absorption temperature is high, a short absorption time is sufficient. It is preferable to employ conditions where a value obtained by multiplying the absorption temperature (° C.) by the absorption time (h) is about 120 to 300 (° C.·h), and preferably 150 to 250 (° C.·h).

It is preferable that the monomers that produce the polymer (Ab) be absorbed in the network structure of the polymer (Aa) in a known solvent (e.g., water) that is used for emulsion polymerization.

The fluorine-containing polymer particles preferably include the polymer (Aa) in an amount of 1 to 60 parts by mass, more preferably 5 to 55 parts by mass, still more preferably 10 to 50 parts by mass, and particularly preferably 20 to 40 parts by mass, based on 100 parts by mass of the fluorine-containing polymer particles. When the fluorine-containing polymer particles include the polymer (Aa) in an amount within the above range, the balance between oxidation resistance and adhesion is improved.

The fluorine-containing polymer particles may be produced (i.e., polymerization of the polymer (Aa) and/or polymerization of the polymer (Ab) performed in a state in which the monomers are absorbed in the polymer (Aa)) in the presence of a known emulsifier (surfactant), initiator, molecular weight modifier, and the like (described later).

1.1.2. Diene Polymer Particles

When using the electrode binder composition according to one embodiment of the invention to produce a negative electrode, it is preferable that the polymer particles (A) be diene polymer particles. The diene polymer particles include (Mc) a repeating unit derived from a conjugated diene compound, (Md) a repeating unit derived from an aromatic vinyl compound, (Me) a repeating unit derived from a (meth)acrylate compound, and (Mf) a repeating unit derived from an unsaturated carboxylic acid.

1.1.2.1. Repeating Unit (Mc) Derived from Conjugated Diene Compound

When the diene polymer particles include the repeating unit (Mc) derived from a conjugated diene compound, a negative electrode binder composition that exhibits excellent viscoelasticity and strength can easily be prepared. Specifically, a polymer that includes a repeating unit derived from a conjugated diene compound exhibits a high binding capability. Since the rubber elasticity due to the conjugated diene compound is provided to the polymer, the polymer can follow a change in volume of an electrode. It is considered that the polymer is thus provided with an improved binding capability, and durability that maintains charge-discharge characteristics for a long time.

Examples of the conjugated diene compound include 1,3-butadiene, 2-methyl-1,3-butadiene, 2,3-dimethyl-1,3-butadiene, 2-chloro-1,3-butadiene, and the like. The conjugated diene compound may be one or more compounds selected from these compounds. It is particularly preferable to use 1,3-butadiene as the conjugated diene compound.

The repeating unit (Mc) derived from a conjugated diene compound is preferably used in an amount of 30 to 60 parts by mass, and more preferably 40 to 55 parts by mass, based on 100 parts by mass of the total repeating units. When the repeating unit (Mc) is used in an amount within the above range, the binding capability is further improved.

1.1.2.2. Repeating Unit (Md) Derived from Aromatic Vinyl Compound

When the diene polymer particles include the repeating unit (Md) derived from an aromatic vinyl compound, the diene polymer particles exhibit excellent affinity to a conductivity-imparting agent included in a negative electrode slurry.

Specific examples of the aromatic vinyl compound include styrene, alpha-methylstyrene, p-methylstyrene, vinyltoluene, chlorostyrene, divinylbenzene, and the like. The aromatic vinyl compound may be one or more compounds selected from these compounds. It is particularly preferable to use styrene as the aromatic vinyl compound.

The repeating unit (Md) derived from an aromatic vinyl compound is preferably used in an amount of 10 to 40 parts by mass, and more preferably 15 to 30 parts by mass, based on 100 parts by mass of the total repeating units. When the repeating unit (Md) is used in an amount within the above range, the polymer particles exhibit moderate adhesion to graphite that may be used as an electrode active material. Moreover, the resulting electrode layer exhibits excellent flexibility and good adhesion to a collector.

1.1.2.3. Repeating Unit (Me) Derived from (Meth)Acrylate Compound

When the diene polymer particles include the repeating unit (Me) derived from a (meth)acrylate compound, the diene polymer particles exhibit good affinity to an electrolyte. This makes it possible to suppress an increase in internal resistance that may occur when the binder serves as an electrical resistance component in the battery. It is also possible to prevent a decrease in adhesion due to excessive absorption of the electrolyte.

Specific examples of the (meth)acrylate compound include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like. The (meth)acrylate compound may be one or more compounds selected from these compounds. It is preferable to use one or more (meth)acrylate compounds selected from methyl (meth)acrylate, ethyl (meth)acrylate, 2-ethylhexyl (meth)acrylate, hydroxymethyl (meth)acrylate, and hydroxyethyl (meth)acrylate. It is particularly preferable to use methyl (meth)acrylate or hydroxymethyl (meth)acrylate.

The repeating unit (Me) derived from a (meth)acrylate compound is preferably used in an amount of 5 to 40 parts by mass, and more preferably 10 to 30 parts by mass, based on 100 parts by mass of the total repeating units. The diene polymer particles that include the repeating unit (Me) in an amount within the above range have moderate affinity to an electrolyte. This makes it possible to suppress an increase in internal resistance that may occur when the binder serves as an electrical resistance component in the electrical storage device. It is also possible to prevent a decrease in adhesion due to excessive absorption of the electrolyte.

1.1.2.4. Repeating Unit (Mf) Derived from Unsaturated Carboxylic Acid

When the diene polymer particles include the repeating unit (Mf) derived from an unsaturated carboxylic acid, it is possible to improve the stability of an electrode slurry that is prepared using the electrode binder composition according to one embodiment of the invention.

Specific examples of the unsaturated carboxylic acid include mono- or dicarboxylic acids (anhydrides) such as acrylic acid, methacrylic acid, crotonic acid, maleic acid, fumaric acid, and itaconic acid. The unsaturated carboxylic acid may be one or more compounds selected from these compounds. It is preferable to use one or more unsaturated carboxylic acids selected from acrylic acid, methacrylic acid, and itaconic acid.

The repeating unit (Mf) derived from an unsaturated carboxylic acid is preferably used in an amount of 15 parts by mass or less, and more preferably 0.3 to 10 parts by mass, based on 100 parts by mass of the total repeating units. When the repeating unit (Mf) is used in an amount within the above range, the diene polymer particles exhibit excellent dispersion stability (i.e., aggregates are hardly formed) when preparing an electrode slurry. It is also possible to suppress an increase in viscosity of the slurry over time.

1.1.2.5. Additional Repeating Unit

The diene polymer particles may include an additional repeating unit other than the above repeating units. Examples of the additional repeating unit include a repeating unit derived from an alpha,beta-unsaturated nitrile compound.

When the diene polymer particles include a repeating unit derived from an alpha,beta-unsaturated nitrile compound, it is possible to further improve the swellability of the diene polymer particles in an electrolyte. More specifically, a solvent easily enters the network structure formed of the polymer chains due to the presence of the nitrile group, and the inter-network space increases. Therefore, a solvated lithium ion easily passes through the network structure. It is considered the diffusivity of lithium ions is thus improved, and the electrode resistance decreases, so that excellent charge-discharge characteristics are achieved.

Specific examples of the alpha,beta-unsaturated nitrile compound include acrylonitrile, methacrylonitrile, alpha-chloroacrylonitrile, alpha-ethylacrylonitrile, vinylidene cyanide, and the like. The alpha,beta-unsaturated nitrile compound may be one or more compounds selected from these compounds. It is preferable to use one or more compounds selected from acrylonitrile and methacrylonitrile. It is more preferable to use acrylonitrile.

The repeating unit derived from an alpha,beta-unsaturated nitrile compound is preferably used in an amount of 35 parts by mass or less, and more preferably 10 to 25 parts by mass, based on 100 parts by mass of the total repeating units. The diene polymer particles that include the repeating unit derived from an alpha,beta-unsaturated nitrile compound in an amount within the above range exhibit excellent affinity to an electrolyte, and have a moderate swelling rate. This contributes to an improvement in battery characteristics.

The diene polymer particles may further include repeating units derived from fluorine-containing compounds that include an ethylenically unsaturated bond, such as vinylidene fluoride, tetrafluoroethylene, and hexafluoropropylene; alkylamides of an ethylenically unsaturated carboxylic acid, such as (meth)acrylamide and N-methylolacrylamide; vinyl carboxylates such as vinyl acetate and vinyl propionate; ethylenically unsaturated dicarboxylic anhydrides; monoalkyl esters; monoamides; aminoalkylamides of an ethylenically unsaturated carboxylic acid, such as aminoethylacrylamide, dimethylaminomethylmethacrylamide, and methylaminopropylmethacrylamide; and the like.

1.1.2.6. Production of Diene Polymer Particles

The diene polymer particles may be synthesized by an arbitrary method. The diene polymer particles may be easily synthesized by the following two-stage emulsion polymerization method, for example.

1.1.2.6.1. First-Stage Polymerization Step

A monomer component (I) that is used for the first-stage emulsion polymerization step includes a non-carboxylic acid monomer (e.g., alpha,beta-unsaturated nitrile compound, conjugated diene compound, aromatic vinyl compound, (meth)acrylate compound, and another copolymerizable monomer), and a carboxylic acid monomer (e.g., unsaturated carboxylic acid), for example. The monomer component (I)

preferably includes the non-carboxylic acid monomer in an amount of 80 to 92 parts by mass, and more preferably 82 to 92 parts by mass, based on 100 parts by mass of the non-carboxylic acid monomer and the carboxylic acid monomer. If the monomer component (I) includes the non-carboxylic acid monomer in an amount within the above range, the polymer particles exhibit excellent dispersion stability (i.e., aggregates are hardly formed) when preparing an electrode slurry. It is also possible to suppress an increase in viscosity of the slurry over time.

The content of the (meth)acrylate compound in the non-carboxylic acid monomer included in the monomer component (I) is preferably 14 to 30 mass %. If the content of the (meth)acrylate compound is within the above range, the polymer particles exhibit excellent dispersion stability (i.e., aggregates are hardly formed) when preparing an electrode slurry. Moreover, since the resulting polymer particles exhibit moderate affinity to an electrolyte, it is possible to prevent a decrease in adhesion due to excessive absorption of an electrolyte.

The content of the conjugated diene compound in the non-carboxylic acid monomer included in the monomer component (I) is preferably 10 to 60 mass %. The content of the aromatic vinyl compound in the non-carboxylic acid monomer is preferably 20 to 50 mass %. The content of itaconic acid in the carboxylic acid monomer is preferably 50 to 85 mass %.

1.1.2.6.2. Second-Stage Polymerization Step

A monomer component (II) that is used for the second-stage emulsion polymerization step includes a non-carboxylic acid monomer (e.g., alpha,beta-unsaturated nitrile compound, conjugated diene compound, aromatic vinyl compound, (meth)acrylate compound, and another copolymerizable monomer), and a carboxylic acid monomer (e.g., unsaturated carboxylic acid), for example. The content of the non-carboxylic acid monomer in the monomer component (II) is preferably 94 to 99 mass %, and more preferably 96 to 98 mass %, based on the total amount (=100 mass %) of the non-carboxylic acid monomer and the carboxylic acid monomer. If the content of the non-carboxylic acid monomer is within the above range, the polymer particles exhibit excellent dispersion stability (i.e., aggregates are hardly formed) when preparing an electrode slurry. It is also possible to suppress an increase in viscosity of the slurry over time.

The content of the (meth)acrylate compound in the non-carboxylic acid monomer included in the monomer component (II) is preferably 11.5 mass % or less. If the content of the (meth)acrylate compound is within the above range, the resulting polymer particles exhibit moderate affinity to an electrolyte, so that it is possible to prevent a decrease in adhesion due to excessive absorption of an electrolyte.

The mass ratio "(I)/(II)" of the monomer component (I) to the monomer component (II) is preferably 0.05 to 0.5, and more preferably 0.1 to 0.4. When the mass ratio "(I)/(II)" is within the above range, the polymer particles exhibit excellent dispersion stability (i.e., aggregates are hardly formed) when preparing an electrode slurry. It is also possible to suppress an increase in viscosity of the slurry over time.

1.1.2.6.3. Emulsion Polymerization

The monomer component is subjected to emulsion polymerization in an aqueous medium in the presence of an emulsifier, an initiator, and a molecular weight modifier. Each material used for emulsion polymerization is described below.

Specific examples of the emulsifier include anionic surfactants such as higher alcohol sulfate salts, alkylbenzenesulfonates, alkyl diphenyl ether disulfonates, aliphatic sulfonates, aliphatic carboxylates, dehydroabietates, a naphthalenesulfonic acid-formalin condensate, and sulfate salts of a nonionic surfactant; nonionic surfactants such as polyethylene glycol alkyl esters, polyethylene glycol alkyl phenyl ethers, and polyethylene glycol alkyl ethers; fluorine-containing surfactants such as perfluorobutylsulfonates, perfluoroalkyl group-containing phosphates, perfluoroalkyl group-containing carboxylates, and perfluoroalkyl ethylene oxide adducts; and the like. The emulsifier may be one or more compounds selected from these compounds.

Specific examples of the initiator include water-soluble initiators such as lithium persulfate, potassium persulfate, sodium persulfate, and ammonium persulfate; oil-soluble initiators such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile, and 1,1'-azobis(cyclohexanecarbonitrile); and the like. These compounds may be appropriately used as the initiator. It is particularly preferable to use potassium persulfate, sodium persulfate, cumene hydroperoxide, or t-butyl hydroperoxide. The initiator is used in an appropriate amount taking account of the monomer composition, the pH of the polymerization system, the type of additional additive, and the like.

Specific examples of the molecular weight modifier include alkylmercaptans such as n-hexylmercaptan, n-octylmercaptan, t-octylmercaptan, n-dodecylmercaptan, t-dodecylmercaptan, and n-stearylmercaptan; xanthogen compounds such as dimethylxanthogen disulfide and diisopropylxanthogen disulfide; thiuram compounds such as terpinolene, tetramethylthiuram disulfide, tetraethylthiuram disulfide, and tetramethylthiuram monosulfide; phenol compounds such as 2,6-di-t-butyl-4-methylphenol and styrenated phenol; allyl compounds such as allyl alcohols; halogenated hydrocarbon compounds such as dichloromethane, dibromomethane, and carbon tetrabromide; vinyl ether compounds such as alpha-benzyloxystyrene, alpha-benzyloxyacrylonitrile, and alpha-benzyloxyacrylamide; triphenylethane; pentaphenylethane; acrolein; methacrolein; thioglycolic acid; thiomalic acid; 2-ethylhexyl thioglycolate; alpha-methylstyrene dimers; and the like. The molecular weight modifier may be one or more compounds selected from these compounds.

1.1.2.6.4. Emulsion Polymerization Conditions

The first-stage emulsion polymerization step is preferably performed at 40 to 80° C. for 2 to 4 hours. The polymerization conversion rate in the first-stage emulsion polymerization step is preferably 50% or more, and more preferably 60% or more. The second-stage emulsion polymerization step is preferably performed at 40 to 80° C. for 2 to 6 hours.

After completion of emulsion polymerization, the resulting dispersion is preferably neutralized by adding a neutralizer so as to adjust the pH of the dispersion to about 5 to about 10. The neutralizer is not particularly limited. Examples of the neutralizer include metal hydroxides (e.g., sodium hydroxide and potassium hydroxide), and ammonia. The dispersion exhibits excellent mixing stability as a result of adjusting the pH of the dispersion to 5 to 10. The pH of the dispersion is preferably adjusted to 6 to 9, and more preferably 7 to 8.5. Emulsion polymerization proceeds with excellent dispersion stability when the total solid content in the reaction mixture is adjusted to 50 mass % or less. The total solid content is preferably adjusted to 45 mass % or less, and more preferably 40 mass % or less. The neutralized dispersion may be concentrated so as to increase the solid content in the dispersion and further improve the stability of the particles.

1.1.3. Properties of Polymer Particles (A)

1.1.3.1. Tetrahydrofuran (THF) Insoluble Content

The THF insoluble content in the polymer particles (A) is preferably 80% or more, and more preferably 90% or more. It is considered that the THF insoluble content in the polymer particles (A) is almost proportional to the content of components that are insoluble in an electrolyte used for an electrical storage device. If the THF insoluble content in the polymer particles (A) is within the above range, it is considered that elution of the polymer particles (A) into an electrolyte can be suppressed even when an electrical storage device that is produced using the polymer particles (A) is subjected to repeated charge-discharge cycles for a long term.

1.1.3.2. Transition Temperature

When the polymer particles (A) are fluorine-containing polymer particles, it is preferable that the polymer particles (A) have only one endothermic peak within a temperature range of −50 to +250° C. when subjected to differential scanning calorimetry (DSC) in accordance with JIS K 7121. It is more preferable that the polymer particles (A) have the only one endothermic peak within a temperature range of −30 to +30° C. When the fluorine-containing polymer particles have the only one endothermic peak within a temperature range of −30 to +30° C., the fluorine-containing polymer particles provide excellent flexibility and tackiness to an electrode active material layer, and further improve the adhesion of the electrode active material layer.

The polymer (Aa) normally has an endothermic peak (melting temperature) at −50 to +250° C. The polymer (Ab) normally has an endothermic peak (glass transition temperature) that differs from that of the polymer (Aa). Therefore, when the polymer (Aa) and the polymer (Ab) are present in the particles in a phase separation state (e.g., as a core-shell structure), two endothermic peaks are detected within a temperature range of −50 to +250° C. When the particles have only one endothermic peak within a temperature range of −50 to +250° C. (i.e., when the polymer (Aa) and the polymer (Ab) are not present in the particles in a phase separation state), it is considered that the particles are polymer alloy particles.

When the polymer particles (A) are diene polymer particles, it is preferable that the polymer particles (A) have only one endothermic peak within a temperature range of −50 to +5° C. when subjected to differential scanning calorimetry (DSC) in accordance with JIS K 7121. The polymer particles (A) more preferably have the only one endothermic peak within a temperature range of −30 to 0° C., and still more preferably −25 to −5° C. When the diene polymer particles have the only one endothermic peak within the above temperature range, the diene polymer particles can provide more excellent flexibility and tackiness to the electrode active material layer (i.e., the adhesion of the electrode active material layer can be improved).

1.1.3.3. Number Average Particle Size

It is preferable that the polymer particles (A) have a number average particle size of 50 to 400 nm, and more preferably 100 to 250 nm. When the polymer particles (A) have a number average particle size within the above range, the polymer particles (A) are sufficiently adsorbed on the surface of an electrode active material, and move along with the movement of the electrode active material. This makes it possible to suppress migration of the polymer particles (A) or the electrode active material particles. Thus, a deterioration in electrical characteristics can be suppressed.

Note that the number average particle size of the polymer particles (A) refers to a particle size (D50) at 50% in a cumulative particle size distribution measured using a light scattering particle size analyzer. Examples of the light scattering particle size analyzer include Coulter LS230, Coulter LS100, Coulter LS13 320 (manufactured by Beckman Coulter, Inc.), FPAR-1000 (Otsuka Electronics Co., Ltd.), and the like. These light scattering particle size analyzers can measure the particle size distribution of not only the primary particles of the polymer particles, but also the secondary particles that are formed due to aggregation of the primary particles. Therefore, the particle size distribution measured by the light scattering particle size analyzer can be used as an index of the dispersion state of the polymer particles included in an electrode slurry. The number average particle size of the polymer particles (A) may also be measured by centrifuging an electrode slurry that includes the electrode binder composition and an electrode active material to allow the electrode active material to precipitate, and analyzing the supernatant liquid by the light scattering particle size analyzer.

1.2. Compound (B)

The electrode binder composition according to one embodiment of the invention includes the compound (B) represented by the following general formula (1).

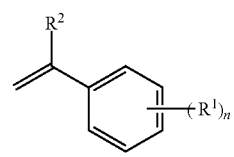

wherein $R^1$ and $R^2$ independently represent a hydrogen atom, a halogen atom, or a monovalent alkyl group, and n is an integer from 0 to 5.

The concentration of the component (B) in the electrode binder composition is 5 to 500 ppm, preferably 5 to 400 ppm, and more preferably 5 to 300 ppm. When the concentration of the component (B) in the electrode binder composition is within the above range, the storage stability of the electrode binder composition is improved. Moreover, when an electrode slurry prepared using the electrode binder composition is applied to a collector to obtain an electrode, an electrical storage device that includes the resulting electrode exhibits excellent charge-discharge characteristics.

It is conjectured that the charge-discharge characteristics of the electrical storage device are improved by the following mechanism. Specifically, since the component (B) is included in the electrode binder composition, the component (B) remains in the electrode active material layer that is formed by applying an electrode slurry prepared using the electrode binder composition to a collector, and drying the electrode slurry. It is conjectured that the component (B) is electropolymerized when initially charging/discharging the electrode that includes the electrode active material layer, so that a protective film is formed on the surface of the electrode active material layer. As a result, formation of dendrites on the surface of the electrode due to repeated charge/discharge operations is suppressed, so that the charge/discharge characteristics of the electrical storage device are improved.

If the concentration of the component (B) in the electrode binder composition is less than 5 ppm, the component (B) may not sufficiently exhibit the above effect, so that an electrical storage device that exhibits good charge-discharge characteristics may not be produced.

Since the compound represented by the general formula (1) easily evaporates due to heating, it is considered that the component (B) that remains in the electrode active material layer is gradually removed from the electrode active material layer when drying (heating) the electrode slurry that has been applied to the collector. If the concentration of the component (B) in the electrode binder composition exceeds 500 ppm, a large amount of the component (B) may remain in the electrode active material layer even after drying the electrode slurry that has been applied to the surface of the collector, and may form an unnecessary protective film (i.e., may increase the resistance of the electrode), so that the resulting electrical storage device may not exhibit sufficient charge-discharge characteristics.

Moreover, the polymer particles (A) may aggregate due to interaction between the polymer particles (A) and the component (B), so that the storage stability of the electrode binder composition may deteriorate.

The component (B) included in the electrode binder composition according to one embodiment of the invention is preferably the compound represented by the general formula (1) in which $R^1$ represents a hydrogen atom or a methyl group. It is more preferable that the component (B) be the compound represented by the general formula (1) in which $R^1$ represents a hydrogen atom since electropolymerization easily proceeds. $R^2$ preferably represents a hydrogen atom or a methyl group, and more preferably a hydrogen atom from the viewpoint of oxidation resistance. Specific examples of the component (B) include styrene, alpha-methylstyrene, o-methylstyrene, m-methylstyrene, p-methylstyrene, o-chlorostyrene, m-chloro styrene, p-chloro styrene, divinylbenzene, and the like. The component (B) may be one or more compounds selected from these compounds. It is particularly preferable that the component (B) be one or more compounds selected from styrene and p-methylstyrene from the viewpoint of an improvement in oxidation resistance.

It is preferable that the component (B) included to the electrode binder composition according to one embodiment of the invention have a vapor pressure of 0.1 to 0.9 kPa. When the component (B) has a vapor pressure within the above range, it is possible to form the protective film when the concentration of the component (B) is 5 to 500 ppm. It is also possible to reduce the amount of the component (B) that remains in the electrode active material layer.

1.3. Liquid Medium (C)

The electrode binder composition according to one embodiment of the invention includes the liquid medium (C). The liquid medium (C) is preferably an aqueous medium that contains water. The aqueous medium may include a non-aqueous medium other than water. Examples of the non-aqueous medium include amide compounds, hydrocarbons, alcohols, ketones, esters, amine compounds, lactones, sulfoxides, sulfone compounds, and the like. The non-aqueous medium may be one or more compounds selected from these compounds. When the liquid medium (C) includes water and the non-aqueous medium other than water, the content of water in the liquid medium (C) is preferably 90 mass % or more, and more preferably 98 mass % or more, based on the total amount (100 mass %) of the liquid medium (C). When an aqueous medium is used as the liquid medium (C), the electrode binder composition according to one embodiment of the invention has a low impact on the environment, and is highly safe for the operator.

The aqueous medium preferably includes the non-aqueous medium in an amount of 10 parts by mass or less, and more preferably 5 parts by mass or less based on 100 parts by mass of the aqueous medium. It is particularly preferable that the aqueous medium does not substantially contain the non-aqueous medium. The expression "do not substantially contain" used herein means that the non-aqueous medium is not intentionally added as the liquid medium. Therefore, the liquid medium (C) may include a non-aqueous medium that is inevitably mixed in the liquid medium (C) when preparing the electrode binder composition.

1.4. Additive

The electrode binder composition according to one embodiment of the invention may optionally include an additive in addition to the components (A), (B), and (C). Examples of the additive include a thickener. When the electrode binder composition according to one embodiment of the invention includes a thickener, it is possible to further improve the applicability of the electrode binder composition, the charge-discharge characteristics of the resulting electrical storage device, and the like.

Examples of the thickener include cellulose compounds such as carboxymethyl cellulose, methyl cellulose, and hydroxypropyl cellulose; ammonium salts or alkali metal salts of the cellulose compounds; polycarboxylic acids such as poly(meth)acrylic acid and a modified poly(meth)acrylic acid; alkali metal salts of the polycarboxylic acids; polyvinyl alcohol-based (co)polymers such as polyvinyl alcohol, a modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. It is particularly preferable to use an alkali metal salt of carboxymethyl cellulose, an alkali metal salt of poly(meth)acrylic acid, or the like.

Examples of a commercially available alkali metal salt of carboxymethyl cellulose include CMC1120, CMC1150, CMC2200, CMC2280, CMC2450 (all manufactured by Daicel Chemical Industries), and the like.

When the electrode binder composition according to one embodiment of the invention includes the thickener, the content of the thickener in the electrode binder composition is preferably 5 mass % or less, and more preferably 0.1 to 3 mass %, based on the total solid content of the electrode binder composition.

2. ELECTRODE SLURRY

An electrode slurry according to one embodiment of the invention may be prepared using the electrode binder composition according to one embodiment of the invention. The term "electrode slurry" used herein refers to a dispersion that is applied to the surface of a collector, and dried to form an electrode active material layer on the surface of the collector. The electrode slurry according to one embodiment of the invention includes the electrode binder composition, an electrode active material, and water. Each component of the electrode slurry according to one embodiment of the invention is described in detail below. Note that the components of the electrode binder composition are the same as described above, and detailed description thereof is omitted.

2.1. Electrode Active Material

A material for forming the electrode active material included in the electrode slurry is not particularly limited. An arbitrary material may be appropriately selected depending on the type of the target electrical storage device.

For example, when producing a positive electrode of a lithium-ion secondary battery, it is preferable to use a lithium-containing oxide. The term "oxide" used herein refers to a compound or a salt that includes oxygen, and an element that has an electronegativity smaller than that of oxygen. The term "oxide" used herein includes metal oxides, metal phosphates, metal nitrates, halogen oxo acid salts of metals, metal sulfonates, and the like.

Examples of the lithium-containing oxide include a complex metal oxide represented by the following general formula (3a) or (3b), and a lithium-containing oxide that is represented by the following general formula (4) and has an olivine crystal structure. It is preferable that the lithium-containing oxide be one or more lithium-containing oxides selected from these lithium-containing oxides.

$$Li_{1+x}M^1{}_yM^2{}_zO_2 \tag{3a}$$

$$Li_{1+x}M^1{}_yM^2{}_zO_4 \tag{3b}$$

wherein $M^1$ represents at least one metal atom selected from the group consisting of Co, Ni, and Mn, $M^2$ represents at least one metal atom selected from the group consisting of Al and Sn, O represents an oxygen atom, x is a number that satisfies $0.10 \geq x \geq 0$, y is a number that satisfies $4.00 \geq y \geq 0.85$, and z is a number that satisfies $2.00 \geq z \geq 0$.

$$Li_{1-x}M^3{}_x(XO_4) \tag{4}$$

wherein $M^3$ represents an ion of at least one metal selected from the group consisting of Mg, Ti, V, Nb, Ta, Cr, Mn, Fe, Co, Ni, Cu, Zn, Al, Ga, Ge, and Sn, X represents at least one atom selected from the group consisting of Si, S, P, and V, and x is a number that satisfies $0 < x < 1$.

x in the general formula (4) is selected depending on the valency of $M^3$ and X so that the valency of the general formula (4) is zero.

Examples of the complex metal oxide represented by the general formula (3a) or (3b) include $LiCoO_2$, $LiNiO_2$, $LiN$-$iyCo_{1-y}O_2$ (y=0.01 to 0.99), $LiMnO_2$, $LiMn_2O_4$, $LiCo_xN$-$n_yNi_zO_2$ (x+y+z=1), and the like. These complex metal oxides may be used either alone or in combination. A high-voltage electrical storage device having a high energy density can be obtained when using $LiCoO_2$, $LiMn_2O_4$, $LiNiO_2$, or $LiNi_{0.33}Mn_{0.33}CO_{0.33}O_2$ due to a high electrode potential and high efficiency. It is particularly preferable to use $Li_{i+x}M^1{}_yM^2{}_zO_2$ due to a high Li diffusion rate in a solid and a high charge-discharge rate.

The lithium-containing oxide that is represented by the general formula (4) and has an olivine crystal structure differs in electrode potential depending on the metal element $M^3$. Therefore, the battery voltage can be arbitrarily set by appropriately selecting the metal element M. Examples of the lithium-containing oxide having an olivine crystal structure include $LiFePO_4$, $LiCoPO_4$, $Li_{0.90}Ti_{0.05}Nb_{0.05}Fe_{0.30}Co_{0.30}Mn_{0.30}PO_4$, and the like. Among these, $LiFePO_4$ is preferable since an iron compound used as the raw material is easily available and is inexpensive. A compound in which the Fe ion of the above compounds is substituted with a Co ion, an Ni ion, or an Mn ion has the same crystal structure as the above compounds, and similarly functions as the electrode active material.

When producing a negative electrode of a lithium-ion secondary battery, carbon may be used as the electrode active material (negative electrode active material), for example. Specific examples of carbon include a carbon material that is obtained by firing an organic polymer compound (e.g., phenol resin, polyacrylonitrile, or cellulose); a carbon material that is obtained by firing coke or pitch; artificial graphite; natural graphite; and the like.

When producing an electrical double-layer capacitor electrode, activated carbon, activated carbon fibers, silica, alumina, or the like may be used as the electrode active material, for example. When producing a lithium-ion capacitor electrode, a carbon material (e.g., graphite, non-graphitizable carbon, hard carbon, or coke), a polyacenic organic semiconductor (PAS), or the like may be used as the electrode active material, for example.

The electrode active material used for a positive electrode preferably has a number average particle size (Db) of 0.4 to 10 micrometers, and more preferably 0.5 to 7 micrometers. The electrode active material used for a negative electrode preferably has a number average particle size (Db) of 3 to 30 micrometers, and more preferably 5 to 25 micrometers. If the electrode active material has a number average particle size (Db) within the above range, the diffusion length of lithium ions in the electrode active material decreases. This makes it possible to reduce resistance that occurs due to insertion and extraction of lithium ions when charging/discharging the battery, so that the charge-discharge characteristics are further improved. When the electrode slurry includes a conductivity-imparting agent (described below), and the electrode active material has a number average particle size (Db) within the above range, the contact area between the electrode active material and the conductivity-imparting agent becomes sufficient, so that the electron conductivity of the electrode is improved, and the electrode resistance is further reduced.

Note that the number average particle size (Db) of the electrode active material refers to a particle size (D50) at 50% in a cumulative particle size distribution measured by a laser diffraction particle size analyzer. Examples of the laser diffraction particle size analyzer include the HORIBA LA-300 series, the HORIBA LA-920 series (manufactured by Horiba, Ltd.), and the like. The laser diffraction particle size analyzer can measure the particle size distribution of not only the primary particles of the electrode active material, but also the secondary particles that are formed due to aggregation of the primary particles. Therefore, the number average particle size (Db) measured by the laser diffraction particle size analyzer can be used as an index of the dispersion state of the electrode active material in the electrode slurry. The number average particle size (Db) of the electrode active material may also be measured by centrifuging the electrode slurry to allow the electrode active material to precipitate, and analyzing the supernatant liquid by the laser diffraction particle size analyzer.

2.2. Optional Components

The electrode slurry may include an optional component other than the above components. Example of the optional component include a conductivity-imparting agent, a non-aqueous medium, a thickener, and the like.

2.2.1. Conductivity-Imparting Agent

A lithium-ion secondary battery may include carbon or the like as the conductivity-imparting agent. A nickel-hydrogen secondary battery may include cobalt oxide as the conductivity-imparting agent included in the positive electrode, and may include nickel powder, cobalt oxide, titanium oxide, carbon, or the like as the conductivity-imparting agent included in the negative electrode. Examples of carbon include graphite, activated carbon, acetylene black, furnace black, graphite, carbon fibers, fullerenes, and the like. Among these, acetylene black or furnace black is preferable. The conductivity-imparting agent is preferably used in an amount of 20 parts by mass or less, more preferably 1 to 15 parts by mass, and particularly preferably 2 to 10 parts by mass, based on 100 parts by mass of the electrode active material.

2.2.2. Non-Aqueous Medium

The electrode slurry may include a non-aqueous medium that has a normal boiling point of 80 to 350° C. from the viewpoint of improving the applicability of the electrode slurry. Specific examples of the non-aqueous medium include amide compounds such as N-methylpyrrolidone, dimethylformamide, and N,N-dimethylacetamide; hydrocarbons such as toluene, xylene, n-dodecane, and tetralin; alcohols such as 2-ethyl-1-hexanol, 1-nonanol, and lauryl alcohol; ketones such as methyl ethyl ketone, cyclohexanone, phorone, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as gamma-butyrolactone and delta-butyrolactone; sulfoxide/sulfone compounds such as dimethyl sulfoxide and sulfolane; and the like. The non-aqueous medium may be one or more compounds selected from these compounds. It is preferable to use N-methylpyrrolidone as the non-aqueous medium in terms of the stability of the polymer particles, and workability when applying the electrode slurry.

2.2.3. Thickener

The electrode slurry may include the thickener in order to improve the applicability of the electrode slurry. Specific examples of the thickener include the compounds mentioned above in the section "1.4. Additive".

The content of the thickener in the electrode slurry is preferably 20 mass % or less, more preferably 0.1 to 15 mass %, and particularly preferably 0.5 to 10 mass %, based on the total solid content of the electrode slurry.

2.3. Method of Preparing Electrode Slurry

The electrode slurry according to one embodiment of the invention may be prepared by mixing the electrode binder composition according to one embodiment of the invention, the electrode active material, water, and an optional additive. The components may be mixed with stirring using a known technique (e.g., technique using a stirrer, a deaerator, a bead mill, a high-pressure homogenizer, or the like).

It is preferable that at least part of the electrode slurry preparation process (i.e., the component mixing operation) be performed under reduced pressure. This makes it possible to prevent formation of bubbles in the resulting electrode layer. It is preferable to mix the components under a reduced pressure (absolute pressure) of about $5.0 \times 10^3$ to about $5.0 \times 10^5$ Pa.

When mixing (stirring) the components to prepare the electrode slurry, it is necessary to select a mixer that can stir the components so that aggregates of the electrode active material do not remain in the resulting slurry, and select necessary and sufficient dispersion conditions. The degree of dispersion may be measured using a grind gage. It is preferable that the components be mixed and dispersed so that the resulting slurry does not include aggregates having a size of 100 micrometers or more. Examples of the mixer that satisfies the above conditions include a ball mill, a sand mill, a pigment disperser, a grinder, an ultrasonic disperser, a homogenizer, a planetary mixer, a Hobart mixer, and the like.

2.4. Properties of Electrode Slurry

The ratio "Da/Db" of the number average particle size (Da) of the polymer particles (A) included in the electrode binder composition to the number average particle size (Db) of the electrode active material is preferably 0.01 to 1.0, and more preferably 0.05 to 0.5 when producing a positive electrode. The ratio "Da/Db" is preferably 0.002 to 0.13, and more preferably 0.003 to 0.1 when producing a negative electrode. The technical meaning of the above range is described below.

It was confirmed that at least one of the polymer particles (A) and the electrode active material migrates when drying a film formed by applying the electrode slurry to the surface of a collector. Specifically, the particles move along the thickness direction of the film due to surface tension. More specifically, at least one of the polymer particles (A) and the electrode active material moves toward the side of the film that does not come in contact with the collector (i.e., a gas-solid interface at which water evaporates). When migration has occurred, the distribution of the polymer particles (A) and the electrode active material becomes non-uniform in the thickness direction of the film, so that a deterioration in electrode characteristics, a decrease in adhesion, and the like may occur. For example, when the polymer particles (A) that function as a binder have bled (moved) toward the gas-solid interface of the electrode active material layer, and the amount of the polymer particles (A) at the interface between the collector and the electrode active material layer has relatively decreased, penetration of an electrolyte into the electrode active material layer is hindered, so that sufficient electrical characteristics may not be achieved. Moreover, adhesion between the collector and the electrode active material layer may decrease, so that the electrode active material layer may be removed from the collector. When the polymer particles (A) have bled, the smoothness of the electrode active material layer surface may deteriorate.

When the ratio "Da/Db" is within the above range, it is possible to prevent the above problems, and easily produce an electrode that exhibits excellent electrical characteristics and excellent adhesion. If the ratio "Da/Db" is less than the above range, the difference in average particle size between the polymer particles (A) and the electrode active material may become small. This may decrease the contact area between the polymer particles (A) and the electrode active material, so that powder fall resistance may become insufficient. If the ratio "Da/Db" exceeds the above range, the difference in average particle size between the polymer particles (A) and the electrode active material may increase to a large extent. As a result, the adhesion of the polymer particles (A) may become insufficient, so that the adhesion between the collector and the electrode active material layer may become insufficient.

The solid content (i.e., the ratio of the total mass of the components other than a solvent with respect to the total mass of the slurry) of the electrode slurry according to one embodiment of the invention is preferably 20 to 80 mass %, and more preferably 30 to 75 mass %.

The electrode slurry according to one embodiment of the invention preferably has a spinnability of 30 to 80%, more preferably 33 to 79%, and still more preferably 35 to 78%. If the spinnability is less than 30%, the leveling properties of the electrode slurry may be insufficient when applying the electrode slurry to the collector, so that it may be difficult to produce an electrode having a uniform thickness. If an electrode having a non-uniform thickness is used to produce a battery, an in-plane distribution of the charge-discharge reaction may occur, so that it may be difficult to achieve stable battery characteristics. If the spinnability exceeds 80%, dripping may easily occur when applying the electrode slurry to the collector, so that it may be difficult to obtain an electrode with a stable quality. If the spinnability is within the above range, it is possible to prevent such problems, and easily produce an electrode that exhibits excellent electrical characteristics and excellent adhesion.

The term "spinnability" used herein refers to a value measured as described below.

Specifically, a Zahn cup ("Zahn Viscosity Cup No. 5" manufactured by Taiyu Kizai Co., Ltd.) having an orifice (diameter: 5.2 mm) at the bottom thereof is provided. 40 g of the electrode slurry is poured into the Zahn cup in a state in which the orifice is closed. When the orifice is opened, the electrode slurry begins to flow out from the orifice. The spinnability is calculated by the following expression (5) when the time when the orifice is opened is referred to as $T_o$, the time when the electrode slurry no longer flows out from the orifice as if to form a thread is referred to as $T_A$, and the time when the electrode slurry no longer flows out from the orifice is referred to as $T_B$.

$$\text{Spinnability}(\%) = ((T_A - T_0)/(T_B - T_0)) \times 100 \tag{5}$$

3. ELECTRODE

An electrode according to one embodiment of the invention includes a collector, and a layer that is formed by applying the electrode slurry according to one embodiment of the invention to the surface of the collector, and drying the slurry. The electrode may be produced by applying the electrode slurry to the surface of an arbitrary collector (e.g., metal foil) to form a film, and drying the film to form an electrode active material layer. The electrode thus produced has a structure in which an electrode active material layer that includes the polymer (A), the electrode active material, and an optional component is bonded to the collector. The electrode exhibits excellent adhesion between the collector and the electrode active material layer, and has excellent charge-discharge rate characteristics (i.e., electrical characteristics). Therefore, the electrode may be suitable as an electrode used for an electrical storage device.

The collector is not particularly limited so long as the collector is made of a conductive material. A collector made of a metal (e.g., iron, copper, aluminum, nickel, or stainless steel) may be used for a lithium-ion secondary battery. The effects of the electrode slurry that is prepared using the electrode binder composition are most effectively achieved when using an aluminum collector for the positive electrode, and using a copper collector for the negative electrode. A collector made of a perforated metal, an expanded metal, wire gauze, a foam metal, sintered metal fibers, a metal-plated resin sheet, or the like is used for a nickel-hydrogen secondary battery. The shape and the thickness of the collector are not particularly limited. It is preferable to use a sheet-like collector having a thickness of about 0.001 to about 0.5 mm.

The electrode slurry may be applied to the collector by an arbitrary application method. Examples of the application method include a doctor blade method, a dipping method, a reverse roll method, a direct roll method, a gravure method, an extrusion method, an immersion method, a brush coating method, and the like. The amount of the electrode slurry applied to the collector is not particularly limited. It is preferable that the electrode slurry be applied to the collector so that an electrode active material layer obtained by removing the liquid medium (water and an optional non-aqueous medium) has a thickness of 0.005 to 5 mm, and more preferably 0.01 to 2 mm. When the thickness of the electrode active material layer is within the above range, the electrolyte solution can be effectively absorbed in the electrode active material layer. As a result, metal ions are easily transferred between the electrode active material included in the electrode active material layer and the electrolyte solution due to charging/discharging, so that the resistance of the electrode can be further reduced. Moreover, the electrode active material layer is not removed from the collector (i.e., the electrical storage device electrode exhibits flexibility) even if the electrode is folded or wound.

The film formed by applying the electrode slurry may be dried (i.e., water and an optional non-aqueous medium may be removed) by an arbitrary method. For example, the film may be dried using warm air, hot air, or low humid air, may be dried under vacuum, or may be dried by applying (far) infrared radiation, electron beams, or the like. The drying speed may be appropriately set so that the liquid medium can be removed as quickly as possible, cracks do not occur in the electrode active material layer due to stress concentration, and the electrode active material layer is not removed from the collector.

It is preferable to increase the density of the electrode active material layer by pressing the dried collector so that the porosity falls within the following range. The collector may be pressed using a die press, a roll press, or the like. The press conditions are appropriately set depending on the type of press, and the desired porosity and density of the electrode active material layer. The press conditions can be easily set by a person having ordinary skill in the art by performing some preliminary experiments. When using a roll press, the linear pressure of the roll press may be set to 0.1 to 10 t/cm, and preferably 0.5 to 5 t/cm, the roll temperature may be set to 20 to 100° C., and the feed speed (roll rotational speed) of the dried collector may be set to 1 to 80 m/min, and preferably 5 to 50 m/min.

The density of the electrode active material layer after pressing is preferably 1.5 to 5.0 g/cm$^3$, more preferably 1.5 to 4.0 g/cm$^3$, and particularly preferably 1.6 to 3.8 g/cm$^3$. When the electrode active material is the complex metal oxide represented by the general formula (3a) or (3b), the density of the electrode active material layer is preferably 2.0 to 4.0 g/cm$^3$, and more preferably 3.0 to 3.5 g/cm$^3$. When the electrode active material is the compound that is represented by the general formula (4) and has an olivine crystal structure, the density of the electrode active material layer is preferably 1.5 to 2.5 g/cm$^3$, more preferably 1.6 to 2.4 g/cm$^3$, still more preferably 1.7 to 2.2 g/cm$^3$, and particularly preferably 1.8 to 2.1 g/cm$^3$. When the density of the electrode active material layer is within the above range, bondability between the collector and the electrode active material layer is improved, so that an electrode that exhibits excellent fall-off resistance and electrical characteristics is obtained. If the density of the electrode active material layer is less than the above range, the polymer (A) included in the electrode active material layer may not sufficiently function as a binder, so that the electrode active material layer may aggregate or may be removed (i.e., fall-off resistance may deteriorate). If the density of the electrode active material layer exceeds the above range, the polymer (A) included in the electrode active material layer may function as a binder to an excessive extent, so that the electrode active material may be bonded too strongly. As a result, the electrode active material layer may not be able to follow the flexible collector, so that the collector and the electrode active material layer may undergo interfacial separation. Note that the density of the electrode active material layer refers to the bulk density of the electrode active material layer, and may be measured by the following method. Specifically, when the electrode includes the electrode active material layer having an area C (cm$^2$) and a thickness D (micrometers) that is provided on one side of the collector, the mass of the collector is A (g), and the mass of the electrical storage device electrode is B (g), the density of the electrode active material layer is defined by the following expression (6).

$$\text{Density(g/cm}^3\text{) of electrode active material layer} = (B(g) - A(g))/(C(\text{cm}^2) \times D(\text{micrometers}) \times 10^{-4}) \quad (6)$$

The porosity of the electrode active material layer after pressing is preferably 10 to 50%, more preferably 15 to 45%, and particularly preferably 20 to 40%. When the porosity of the electrode active material layer is within the above range, bondability between the collector and the electrode active material layer is improved, so that an electrode that exhibits excellent fall-off resistance and electrical characteristics is obtained. Moreover, the electrolyte solution can be sufficiently absorbed in the electrode active material layer, so that the electrode active material surface sufficiently comes in contact with the electrolyte solution. As a result, lithium ions are easily transferred between the electrode active material and the electrolyte solution, so that excellent charge/discharge characteristics can be obtained. Note that the porosity of the electrode active material layer refers to the ratio of the volume of the pores (i.e., the volume obtained by subtracting the volume of the solid (e.g., electrode active material, conductivity-imparting agent, and binder) from the volume of the electrode active material layer) to the total volume of the electrode active material layer. Specifically, when the electrode includes the electrode active material layer having an area C (cm$^2$) and a thickness D (micrometers) that is provided on one side of the collector, the mass of the electrode active material layer is B (g), and the pore volume measured by mercury porosimetry is V (cm$^3$/g), the porosity of the electrode active material layer is defined by the following expression (7).

$$\text{Porosity(\%) of electrode active material layer} = ((V(\text{cm}^3/g) \times B(g))/(C(\text{cm}^2) \times D(\text{micrometers}) \times 10^{-4})) \times 100 \quad (7)$$

The pore volume may be measured by mercury porosimetry using a mercury porosimeter, for example. Examples of the mercury porosimeter include PoreMaster (manufactured by Quantachrome), AutoPore IV (manufactured by Shimadzu Corporation), and the like.

4. ELECTRICAL STORAGE DEVICE

An electrical storage device according to one embodiment of the invention includes the electrode according to one embodiment of the invention and an electrolyte solution, and may be produced by a normal method using various parts (e.g., separator). More specifically, the electrical storage device may be produced by placing a negative electrode on a positive electrode via a separator to form a laminate, rolling or folding the laminate in the shape of a battery, placing the laminate in a battery casing, injecting an electrolyte solution into the battery casing, and sealing the battery casing, for example. The battery may have an arbitrary shape (e.g., coin, button, sheet, cylinder, square, or flat shape).

The electrolyte solution may be in the form of a liquid or gel. The electrolyte solution may be selected from known electrolyte solutions used for an electrical storage device depending on the type of the electrode active material so that the function of the battery is effectively achieved. The electrolyte may be a solution prepared by dissolving an electrolyte in an appropriate solvent.

An arbitrary lithium salt may be used as the electrolyte used for a lithium-ion secondary battery. Specific examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9SO_3$, $Li(CF_3SO_2)_2N$, lithium carboxylate, and the like. When producing a nickel-hydrogen secondary battery, a potassium hydroxide aqueous solution (concentration: 5 mol/l or more) may be used as the electrolyte solution, for example.

The solvent used to dissolve the electrolyte is not particularly limited. Specific examples of the solvent include carbonate compounds such as propylene carbonate, ethylene carbonate, butylene carbonate, dimethyl carbonate, methylethyl carbonate, and diethyl carbonate; lactone compounds such as gamma-butyrolactone; ether compounds such as trimethoxymethane, 1,2-dimethoxyethane, diethyl ether, 2-ethoxyethane, tetrahydrofuran, and 2-methyltetrahydrofuran; sulfoxide compounds such as dimethyl sulfoxide; and the like. The solvent may be one or more compounds selected from these compounds. The concentration of the electrolyte in the electrolyte solution is preferably 0.5 to 3.0 mol/l, and more preferably 0.7 to 2.0 mol/l.

5. EXAMPLES

The invention is further described below by way of examples. Note that the invention is not limited to the following examples. In the examples and comparative examples, the unit "parts" refers to "parts by mass", and the unit "%" refers to "mass %", unless otherwise specified.

5.1. Example 1

5.1.1. Production of Polymer Particles (A)

An autoclave (internal volume: about 6 l) equipped with an electromagnetic stirrer, of which the internal atmosphere had been sufficiently replaced with nitrogen, was charged with 2.5 l of deoxidized purified water and 25 g of ammonium perfluorodecanoate (emulsifier). The mixture was heated to 60° C. with stirring at 350 rpm. The autoclave was then charged with a monomer gas mixture of vinylidene fluoride (VDF) (70%) and hexafluoropropylene (HFP) (30%) until the internal pressure reached 20 kg/cm$^2$. 25 g of a CFC-113 solution containing 20% of diisopropyl peroxydicarbonate (initiator) was injected into the autoclave using nitrogen gas to initiate polymerization. The internal pressure was maintained at 20 kg/cm$^2$ during polymerization by successively injecting a gas mixture of VDF (60.2%) and HFP (39.8%). Since the polymerization rate decreases as polymerization proceeds, 25 g of a CFC-113 solution containing 20% of diisopropyl peroxydicarbonate was again injected using nitrogen gas when 3 hours had elapsed, and the monomers were polymerized for a further 3 hours. The reaction mixture was then cooled without stirring, and unreacted monomers were removed to obtain an aqueous dispersion containing fine particles of a polymer (Aa) (content: 40%). The mass ratio of VDF and HFP in the polymer (Aa) determined by $^{19}$F-NMR analysis was 21/4.

A 7 l separable flask, of which the internal atmosphere had been sufficiently replaced with nitrogen, was charged with 1600 g of the aqueous dispersion containing the fine particles of the polymer (Aa) (polymer (Aa): 25 parts by mass), 0.5 parts by mass of an emulsifier "Adeka Reasoap SR1025" (manufactured by Adeka Corporation), 30 parts by mass of methyl methacrylate (MMA), 40 parts by mass of 2-ethylhexyl acrylate (EHA), 5 parts by mass of methacrylic acid (MAA), and 130 parts by mass of water. The mixture was stirred at 70° C. for 3 hours, so that the monomers were absorbed in the polymer (Aa). After the addition of 20 ml of a tetrahydrofuran solution containing 0.5 parts by mass of azobisisobutyronitrile (oil-soluble initiator), the mixture was reacted at 75° C. for 3 hours, and then reacted at 85° C. for 2 hours. After cooling the mixture to terminate the reaction, the pH of the mixture was adjusted to 7 using a 2.5N sodium hydroxide aqueous solution to obtain an aqueous dispersion containing polymer particles (A) (content: 40%).

About 10 g of the resulting aqueous dispersion was weighed on a Teflon petri dish (diameter: 8 cm), and dried at 120° C. for 1 hour to form a film. 1 g of the resulting film (polymer) was immersed in 400 ml of tetrahydrofuran (THF), followed by shaking at 50° C. for 3 hours. After filtering the THF phase through a wire gauze (300 mesh), THF contained in the filtrate was evaporated off, and the weight (Y (g)) of the residue was measured. The THF insoluble content in the polymer particles calculated by the following expression (8) was 85%.

$$\text{THF insoluble content(\%)} = ((1-Y)/1) \times 100 \quad (8)$$

The resulting fine particles were subjected to differential scanning calorimetry using a differential scanning calorimeter (DSC). It was confirmed that the fine particles had only one glass transition temperature (Tg) at −5° C. Since the particles of the polymer particles (A) had only one Tg in spite of using two types of polymers, it is considered that the polymer particles (A) were polymer alloy particles.

5.1.2. Preparation of Electrode Binder Composition 5 g of an aqueous suspension containing styrene (1%) was added to 1000 g of the aqueous dispersion containing the polymer particles (A). The mixture was stirred at 300 rpm to prepare an electrode binder composition. In the examples and comparative examples, when the component (B) was insoluble in water, a dispersion (suspension) prepared by dispersing the component (B) in water using ultrasonic waves was added when preparing the electrode binder composition.

The particle size distribution of the electrode binder composition was measured using a dynamic light scattering particle size analyzer ("FPAR-1000" manufactured by Otsuka Electronics Co., Ltd.), and the modal particle size was determined from the particle size distribution. The number average particle size was calculated to be 330 nm.

The content of the component (B) in the electrode binder composition may be determined by analyzing the electrode binder composition by the following method. Specifically, 0.2 g of the electrode binder composition was weighed, and 20-fold diluted using a solution prepared by dissolving tetradecane (100 ppm) in tetrahydrofuran (internal standard solution) to obtain a measurement sample. The measurement sample was quantitatively determined using a gas chromatography system ("GC6890N" manufactured by Agilent Technologies) (column: HP-1 (30 m×0.25 mm (ID)×1.0 micrometers (thickness)) manufactured by Agilent Technologies). It was thus confirmed that the content of styrene was 50 ppm.

5.1.3. Evaluation of Storage Stability of Electrode Binder Composition

A large amount of electrode binder composition is normally stored for use in an electrical storage device factory. The stored electrode binder composition is used portion by portion as necessary. Therefore, it is necessary to prevent a situation in which the properties of the electrode binder composition change during long-term storage due to precipitation of the polymer particles or the like.

The electrode binder composition may be subjected to a low-temperature environment (about 0° C.) due to a change in ambient temperature during storage since it is difficult to precisely control the storage temperature in terms of cost. Therefore, an electrode binder composition that freezes at 0° C. when evaluating the freezing temperature is not acceptable. The electrode binder composition is required to have a freezing temperature of –0.5° C. or less. When the electrode binder composition has a freezing temperature of –0.5° C. or less, it is determined that the electrode binder composition exhibits excellent stability.

Evaluation of Precipitation 100 g of the electrode binder composition was put in a polyethylene bottle, and stored at 2° C. for 1 month in a refrigerator. When 1 month had elapsed, the electrode binder composition was observed with the naked eye. A case where precipitation was not observed was evaluated as "Acceptable", and a case where precipitation was observed was evaluated as "Unacceptable". The precipitation evaluation results are shown in Table 1.

Evaluation of Freezing Temperature 1000 g of the electrode binder composition was put in a polyethylene bottle, and stored at –10° C. in a refrigerator. The temperature (freezing temperature) at which the electrode binder composition began to freeze was measured. The freezing temperature of the electrode binder composition was found to be –0.7° C. The freezing temperature evaluation results are shown in Table 1.

5.1.4. Preparation and Evaluation of Electrode Slurry

A twin-screw planetary mixer ("TK HIVIS MIX 2P-03" manufactured by PRIMIX Corporation) was charged with 1 part by mass (solid content) of a thickener ("CMC1120" manufactured by Daicel Chemical Industries), 100 parts by mass of an electrode active material (particle size (D50): 0.5 micrometers) (the electrode active material was obtained by grinding commercially available lithium iron phosphate ($LiFePO_4$) using an agate mortar, and classifying the ground product using a sieve), 5 parts by mass of acetylene black, and 68 parts by mass of water. The mixture was stirred at 60 rpm for 1 hour. The electrode binder composition stored as described in the section "5.1.3. Evaluation of storage stability of electrode binder composition" was added to the mixture so that the amount of the polymer particles was 1 part by mass, and the mixture was stirred for 1 hour to obtain a paste. After the addition of water to the paste to adjust the solid content to 50%, the mixture was stirred at 200 rpm for 2 minutes, stirred at 1800 rpm for 5 minutes, and stirred at 1800 rpm for 1.5 minutes under vacuum (about $5.0 \times 10^3$ Pa) using a stirrer/deaerator ("THINKY Mixer (Awatori Rentarou)" manufactured by THINKY Corporation) to prepare an electrode slurry.

Measurement of Spinnability

The spinnability of the electrode slurry was evaluated as described below.

A Zahn cup ("Zahn Viscosity Cup No. 5" manufactured by Taiyu Kizai Co., Ltd.) having an orifice (diameter: 5.2 mm) at the bottom thereof was provided. 40 g of the electrode slurry was poured into the Zahn cup in a state in which the orifice was closed. When the orifice was opened, the electrode slurry began to flow out from the orifice. The time when the orifice was opened is referred to as $T_0$. The time ($T_A$) during which the electrode slurry continuously flowed out from the orifice in the shape of a thread was measured with the naked eye. The time ($T_B$) elapsed until the electrode slurry no longer flowed out from the orifice was also measured. The spinnability of the electrode slurry was calculated by substituting the values $T_0$, $T_A$, and $T_B$ into the following expression (5).

$$\text{Spinnability}(\%) = ((T_A - T_0)/(T_B - T_0)) \times 100 \tag{5}$$

A case where the electrode slurry had a spinnability of 30 to 80% was evaluated as "Acceptable". The spinnability measurement results are shown in Table 1.

5.1.5. Production and Evaluation of Electrode

The electrode slurry prepared as described above was uniformly applied to the surface of an aluminum foil collector (thickness: 30 micrometers) by a doctor blade method so that the film had a thickness of 100 micrometers after drying. The film was then dried at 120° C. for 20 minutes. The film was pressed using a roll press so that the resulting electrode active material layer had the density shown in Table 1 to obtain a an electrode (positive electrode).

Measurement of Crack Rate

The electrode was cut into an electrode plate (width: 2 cm, length: 10 cm), and the electrode plate was subjected to a folding test, in which the electrode plate was folded 100 times in the widthwise direction along a round bar (diameter: 2 mm). The size of a crack that occurred along the round bar was measured with the naked eye to calculate the crack rate. The crack rate was calculated by the following expression (9).

$$\text{Crack rate}(\%) = (\text{length of crack(mm)}/\text{length of electrode plate(mm)}) \times 100 \tag{9}$$

An electrode plate that exhibits excellent flexibility and adhesion has a low crack rate. It is desirable that the electrode have a crack rate of 0%. However, the electrode may have a crack rate of up to 20% when winding the electrode plate together with a separator in a spiral shape. If the electrode has a crack rate of more than 20%, the electrode may easily break (i.e., the electrode plates cannot be produced), resulting in a decrease in productivity. Therefore, the threshold value of the crack rate is 20%. The crack rate measurement results are shown in Table 1.

5.1.6. Production and Evaluation of Electrical Storage Device
Production of Counter Electrode (Negative Electrode)

A twin-screw planetary mixer ("TK HIVIS MIX 2P-03" manufactured by PRIMIX Corporation) was charged with 4 parts by mass (solid content) of polyvinylidene fluoride (PVDF), 100 parts by mass of graphite (negative electrode active material), and 80 parts by mass of N-methylpyrrolidone (NMP). The mixture was stirred at 60 rpm for 1 hour. After the addition of 20 parts by mass of NMP, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (Awatori Rentarou)" manufactured by THINKY Corporation) to prepare a counter electrode (negative electrode) slurry.

The counter electrode (negative electrode) slurry thus prepared was uniformly applied to the surface of a copper foil collector by a doctor blade method so that the film had a thickness of 150 micrometers after drying. The film was then dried at 120° C. for 20 minutes. The film was then pressed using a roll press so that the film had a density of 1.5 g/cm$^3$ to obtain a counter electrode (negative electrode).

Assembly of Lithium-Ion Battery Cell

In a gloved box of which the inner atmosphere was substituted with argon (Ar) so that the dew point was −80° C., a negative electrode (diameter: 15.95 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding entrance of air. A positive electrode (diameter: 16.16 mm) prepared by punching the positive electrode produced as described above was placed on the separator, and the outer casing of the two-electrode coin cell was air-tightly secured using a screw to assemble a lithium-ion battery cell (electrical storage device). Note that the electrolyte solution was prepared by dissolving LiPF$_6$ in ethylene carbonate/ethylmethyl carbonate (mass ratio=1/1) at a concentration of 1 mol/l.

Evaluation of Charge-Discharge Rate Characteristics

The electrical storage device was charged at a constant current of 0.2 C until the voltage reached 4.2 V. The electrical storage device was continuously charged at a constant voltage of 4.2 V. The current was cut off (i.e., the electrical storage device was determined to be fully charged) when the current value reached 0.01 C, and the charge capacity at 0.2 C was measured. The electrical storage device was then discharged at a constant current of 0.2 C. The current was cut off (i.e., the electrical storage device was determined to be fully discharged) when the voltage reached 2.7 V, and the discharge capacity at 0.2 C was measured.

The electrical storage device was then charged at a constant current of 3 C. After the voltage reached 4.2 V, the electrical storage device was continuously charged at a voltage of 4.2 V. The current was cut off (i.e., the electrical storage device was determined to be fully charged) when the current value reached 0.01 C, and the charge capacity at 3 C was measured. The electrical storage device was then discharged at a constant current of 3 C. The current was cut off (i.e., the electrical storage device was determined to be fully discharged) when the voltage reached 2.7 V, and the discharge capacity at 3 C was measured.

The charge rate (%) of the electrical storage device was determined by calculating the rate (%) of the charge capacity at 3 C to the charge capacity at 0.2 C. The discharge rate (%) of the electrical storage device was determined by calculating the rate (%) of the discharge capacity at 3 C to the discharge capacity at 0.2 C. When the charge rate and the discharge rate are 80% or more, the charge-discharge rate characteristics were evaluated as "Acceptable". The charge rate and the discharge rate thus determined are shown in Table 1.

Note that "1 C" refers to a current value that requires 1 hour to fully discharge a cell having a constant electric capacitance. For example, "0.1 C" refers to a current value that requires 10 hours to fully discharge a cell, and "10 C" refers to a current value that requires 0.1 hours to fully discharge a cell.

5.2. Examples 2 to 5 and Comparative Examples 1 and 2

An aqueous dispersion containing polymer particles (A) having the composition shown in Table 1 was prepared in the same manner as in the section "5.1.1. Production of polymer particles (A)" in Example 1, except for changing the monomer composition and the amount of the emulsifier. Water was removed under reduced pressure, or added, depending on the solid content of the aqueous dispersion to obtain an aqueous dispersion having a solid content of 40%. The fine particles obtained in Examples 2 to 5 and Comparative Examples 1 and 2 were subjected to differential scanning calorimetry using a differential scanning calorimeter (DSC). Only one glass transition temperature (Tg) was observed at the temperature shown in Table 1. Since the polymer particles (A) had only one Tg in spite of using two types of polymers, it is considered that the polymer particles (A) were polymer alloy particles.

An electrode binder composition was prepared in the same manner as in the section "5.1.2. Preparation of electrode binder composition" in Example 1, except for changing the type and the amount of the component (B) as shown in Table 1. The electrode binder composition was evaluated in the same manner as in the section "5.1.3. Evaluation of storage stability of electrode binder composition" in Example 1. The results are shown in Table 1.

An electrode slurry was prepared and evaluated in the same manner as in the section "5.1.4. Preparation and evaluation of electrode slurry" in Example 1, an electrode was produced and evaluated in the same manner as in the section "5.1.5. Production and evaluation of electrode" in Example 1, and an electrical storage device was produced and evaluated in the same manner as in the section "5.1.6. Production and evaluation of electrical storage device" in Example 1. The results are shown in Table 1.

5.3. Example 6

5.3.1. Production of Polymer Particles (A)

A 7 l separable flask was charged with 150 parts by mass of water and 0.2 parts by mass of sodium dodecylbenzenesulfonate, and the internal atmosphere of the separable flask was sufficiently replaced with nitrogen. Another container was charged with parts by 60 mass of water, 0.8 parts by mass (solid content) of an ether sulfate emulsifier ("Adeka Reasoap SR1025" manufactured by Adeka Corporation) (emulsifier), 20 parts by mass of 2,2,2-trifluoroethyl methacrylate (TFEMA) (monomer), 10 parts by mass of acrylonitrile (AN)

(monomer), 25 parts by mass of methyl methacrylate (MMA) (monomer), 40 parts by mass of 2-ethylhexyl acrylate (EHA) (monomer), and 5 parts by mass of acrylic acid (MAA) (monomer). The mixture was sufficiently stirred to obtain a monomer emulsion containing the monomer mixture. The inside of the separable flask was then heated to 60° C., and 0.5 parts by mass of ammonium persulfate (initiator) was added to the separable flask. When the temperature inside the separable flask reached 70° C., the monomer emulsion was slowly added to the separable flask over 3 hours while maintaining the temperature inside the separable flask at 70° C. After increasing the temperature inside the separable flask to 85° C., the monomers were polymerized at 85° C. for 3 hours. After cooling the separable flask to terminate the reaction, the pH of the mixture was adjusted to 7.6 using aqueous ammonia to obtain an aqueous dispersion containing polymer particles (A) (content: 30%).

The aqueous dispersion was evaluated in the same manner as in Example 1. The THF insoluble content in the aqueous dispersion was 78%, and only one glass transition temperature was observed at 8° C. An electrode binder composition, an electrode slurry, an electrode, and an electrical storage device were produced and evaluated in the same manner as in Example 1, except that the resulting aqueous dispersion was used.

5.4. Examples 7 and 8

An aqueous dispersion containing polymer particles (A) having the number average particle size shown in Table 1 was obtained in the same manner as in Example 6, except that the types and the amounts (parts) of the monomers were changed as shown in Table 1. An electrode binder composition, an electrode slurry, an electrode, and an electrical storage device were produced and evaluated in the same manner as in Example 1, except that the resulting aqueous dispersion was used.

5.5. Example 9

5.5.1. Production of Polymer Particles (A)

A temperature-adjustable autoclave equipped with a stirrer was charged with 200 parts by mass of water, 0.6 parts by mass of sodium dodecylbenzene sulfonate, 1.0 part by mass of potassium persulfate, 0.5 parts by mass of sodium hydrogen sulfite, 0.2 parts by mass of an alpha-methylstyrene dimer, 0.2 parts by mass of dodecylmercaptan, and the first-stage polymerization components shown in Table 2. The mixture was heated to 70° C., and polymerized for 2 hours. After confirming that the polymerization conversion rate was 80% or more, the second-stage polymerization components shown in Table 2 were added to the mixture over 6 hours while maintaining the reaction temperature at 70° C. When 3 hours had elapsed after the start of addition of the second-stage polymerization components, 1.0 part by mass of an alpha-methylstyrene dimer and 0.3 parts by mass of dodecylmercaptan were added to the mixture. After the addition of the second-stage polymerization components, the mixture was heated to 80° C., and reacted for 2 hours. After completion of polymerization, the pH of the resulting latex was adjusted to 7.5, followed by the addition of 5 parts by mass (solid content) of sodium tripolyphosphate. The residual monomers were removed by steam distillation, and the residue was concentrated under reduced pressure until the solid content reached 50% to obtain an aqueous dispersion containing polymer particles (A) (content: 50%). The aqueous dispersion was evaluated in the same manner as in Example 1. The THF insoluble content in the aqueous dispersion was 90%, and only one glass transition temperature was observed at −20° C.

5.5.2. Preparation of Electrode Binder Composition 3 g of an aqueous suspension containing alpha-methylstyrene (1%) was added to 1000 g of the aqueous dispersion containing the polymer particles (A). The mixture was stirred at 400 rpm to prepare an electrode binder composition.

The particle size distribution of the electrode binder composition was measured using a dynamic light scattering particle size analyzer ("FPAR-1000" manufactured by Otsuka Electronics Co., Ltd.), and the modal particle size was determined from the particle size distribution. The number average particle size was calculated to be 200 nm.

The content of the component (B) in the electrode binder composition may be determined by analyzing the binder composition by the following method. Specifically, 0.2 g of the electrode binder composition was weighed, and 20-fold diluted using a solution prepared by dissolving tetradecane (100 ppm) in tetrahydrofuran (internal standard solution) to obtain a measurement sample. The measurement sample was quantitatively determined using a gas chromatography system ("GC6890N" manufactured by Agilent Technologies) (column: HP-1 (30 m×0.25 mm (ID)×1.0 micrometers (thickness)) manufactured by Agilent Technologies). It was thus confirmed that the content of alpha-methylstyrene was 30 ppm.

5.5.3. Evaluation of Storage Stability of Electrode Binder Composition

The storage stability of the electrode binder composition was evaluated in the same manner as in the section "5.1.3. Evaluation of storage stability of electrode binder composition". The results are shown in Table 1.

5.5.4. Preparation and Evaluation of Electrode Slurry

A twin-screw planetary mixer ("TK HIVIS MIX 2P-03" manufactured by PRIMIX Corporation) was charged with 1 part by mass (solid content) of a thickener ("CMC2200" manufactured by Daicel Chemical Industries), 100 parts by mass (solid content) of graphite (negative electrode active material), and 68 parts by mass of water. The mixture was stirred at 60 rpm for 1 hour. After the addition of 2 parts by mass (solid content) of the electrode binder composition stored as described in the section "5.5.3. Evaluation of storage stability of electrode binder composition", the mixture was stirred for 1 hour to obtain a paste. After the addition of water to the paste to adjust the solid content to 50%, the mixture was stirred at 200 rpm for 2 minutes, stirred at 1800 rpm for 5 minutes, and stirred at 1800 rpm for 1.5 minutes under vacuum, using a stirrer/deaerator ("THINKY Mixer (Awatori Rentarou)" manufactured by THINKY Corporation) to prepare an electrode slurry. The spinnability of the electrode slurry was evaluated in the same manner as in the section "5.1.4. Preparation and evaluation of electrode slurry". The results are shown in Table 1.

5.5.5. Production and Evaluation of Electrode

The electrode slurry prepared in the section "5.5.4. Preparation and evaluation of electrode slurry" was uniformly applied to the surface of a copper foil collector (thickness: 20 micrometers) by a doctor blade method so that the film had a thickness of 80 micrometers after drying. The film was then dried at 120° C. for 20 minutes. The film was then pressed using a roll press so that the resulting electrode layer had the density shown in Table 1 to obtain an electrode (negative electrode). The crack rate of the electrode was evaluated in the same manner as in the section "5.1.5. Production and evaluation of electrode". The results are shown in Table 1.

5.5.6. Production and Evaluation of Electrical Storage Device
Production of Counter Electrode (Positive Electrode)

A twin-screw planetary mixer ("TK HIVIS MIX 2P-03" manufactured by PRIMIX Corporation) was charged with 4.0 parts by mass (solid content) of an electrochemical device electrode binder ("KF Polymer #1120" manufactured by Kureha Corporation), 3.0 parts by mass of a conductive aid ("DENKA BLACK" 50% pressed product, manufactured by Denki Kagaku Kougyou Kabushiki Kaisha), 100 parts by mass of $LiCoO_2$ (particle size: 5 micrometers, manufactured by Hayashi Kasei Co., Ltd.) (positive electrode active material), and 36 parts by mass of N-methylpyrrolidone (NMP). The mixture was stirred at 60 rpm for 2 hours to prepare a paste. After the addition of NMP to the paste to adjust the solid content to 65%, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (Awatori Rentarou)" manufactured by THINKY Corporation) to prepare an electrode slurry. The electrode slurry was uniformly applied to the surface of an aluminum foil collector by a doctor blade method so that the film had a thickness of 80 micrometers after drying. The film was then dried at 120° C. for 20 minutes. The film was then pressed using a roll press so that the resulting electrode layer had a density of 3.0 g/cm$^3$ to obtain a counter electrode (positive electrode).

Assembly of Lithium-Ion Battery Cell

In a gloved box of which the inner atmosphere was substituted with argon (Ar) so that the dew point was −80° C., a negative electrode (diameter: 15.95 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding entrance of air. A positive electrode (diameter: 16.16 mm) prepared by punching the positive electrode produced in the section "Production of counter electrode (positive electrode)" was placed on the separator, and the outer casing of the two-electrode coin cell was air-tightly secured using a screw to assemble a lithium-ion battery cell (electrical storage device). Note that the electrolyte solution was prepared by dissolving $LiPF_6$ in ethylene carbonate/ethylmethyl carbonate (mass ratio=1/1) at a concentration of 1 mol/l. The charge-discharge rate characteristics of the electrical storage device were evaluated in the same manner as in the section "5.1.6. Preparation and evaluation of electrical storage device". The results are shown in Table 1.

5.6. Examples 10 and 11 and Comparative Examples 3 and 4

An aqueous dispersion containing polymer particles (A) having the composition shown in Table 1 was prepared in the same manner as in the section "5.5.1. Production of polymer particles (A)" in Example 9, except for changing the monomer composition and the amount of the emulsifier. Water was removed under reduced pressure, or added, depending on the solid content of the aqueous dispersion to obtain an aqueous dispersion having a solid content of 50%.

An electrode binder composition was prepared in the same manner as in the section "5.5.2. Preparation of electrode binder composition" in Example 9, except for changing the type and the amount of the component (B) as shown in Table 1. The electrode binder composition was evaluated in the same manner as in the section "5.5.3. Evaluation of storage stability of electrode binder composition" in Example 9. The results are shown in Table 1.

An electrode slurry was prepared and evaluated in the same manner as in the section "5.5.4. Preparation and evaluation of electrode slurry" in Example 9, an electrode was produced and evaluated in the same manner as in the section "5.5.5. Production and evaluation of electrode" in Example 9, and an electrical storage device was produced and evaluated in the same manner as in the section "5.5.6. Production and evaluation of electrical storage device" in Example 9. The results are shown in Table 1.

5.7. Evaluation Results

The electrode binder compositions of Examples 1 to 11 and Comparative Examples 1 to 4 and the evaluation results thereof are shown in Table 1. The content of the first-stage polymerization component and the second-stage polymerization component when preparing the aqueous dispersions containing the polymer particles (A) of Examples 9 to 11 and Comparative Examples 3 and 4 is shown in Table 2.

TABLE 1

| Component | Polymer particles | Example 1 | Example 2 | Example 3 | Example 4 | Example 5 | Example 6 | Example 7 | Example 8 |
|---|---|---|---|---|---|---|---|---|---|
| (A) | | | | Fluorine-containing polymer particles | | | | | |
| | VDF (parts by mass) | 21 | 20 | 24 | 21 | 21 | — | — | — |
| | HFP (parts by mass) | 4 | 5 | 1 | 4 | 4 | — | — | — |
| | TFEMA (parts by mass) | — | — | — | — | — | 20 | — | — |
| | TFEA (parts by mass) | — | — | — | — | — | — | 20 | — |
| | HFIPA (parts by mass) | — | — | — | — | — | — | — | — |
| | MMA (parts by mass) | 30 | 30 | 30 | 30 | 30 | 25 | 9 | 30 |
| | EHA (parts by mass) | 40 | 40 | 40 | 40 | 40 | 40 | 40 | 40 |
| | HEMA (parts by mass) | — | — | — | — | — | — | — | — |
| | MAA (parts by mass) | 5 | — | 5 | 5 | 5 | — | — | — |
| | AA (parts by mass) | — | 5 | — | — | — | 5 | 5 | 5 |
| | TA (parts by mass) | — | — | — | — | — | — | — | — |
| | DVB (parts by mass) | — | — | — | — | — | — | 0.5 | — |
| | TMPTMA (parts by mass) | — | — | — | — | — | — | 0.5 | — |
| | AN (parts by mass) | — | — | — | — | — | 10 | 25 | 5 |
| | BD (parts by mass) | — | — | — | — | — | — | — | — |
| | ST (parts by mass) | — | — | — | — | — | — | — | — |
| Component (B) | Styrene (ppm) | 50 | — | — | — | 7 | — | — | 100 |
| | alpha-Methylstyrene (ppm) | — | — | — | 300 | — | — | 400 | — |
| | p-Methylstyrene (ppm) | — | 100 | — | — | — | 400 | — | — |
| | p-Chlorostyrene (ppm) | — | — | 400 | — | — | — | — | — |

TABLE 1-continued

| Component (C) | | Water | Water | Water | Water | Water | Water | Water | Water |
|---|---|---|---|---|---|---|---|---|---|
| Properties of polymer particles | Number average particle size (nm) | 330 | 210 | 330 | 330 | 330 | 110 | 250 | 300 |
| | THF insoluble content (%) | 85 | 95 | 95 | 85 | 85 | 78 | 75 | 70 |
| | Tg (° C.) | −5 | −5 | 1 | −5 | −5 | 8 | 2 | −9 |
| Storage stability of binder composition | Precipitation | Acceptable | Acceptable | Acceptable | Acceptable | Acceptable | Acceptable | Acceptable | Acceptable |
| | Freezing temperature (° C.) | −0.7 | −0.6 | −0.7 | −0.7 | −0.5 | −0.8 | −0.6 | −0.7 |
| Properties of slurry | Spinnability (%) | 70 | 55 | 80 | 78 | 68 | 40 | 40 | 51 |
| Properties of electrode | Density of active material layer (g/cm³) | 1.6 | 1.8 | 2.4 | 1.7 | 2 | 3.8 | 2.7 | 3.4 |
| | Crack rate (%) | 13 | 5 | 6 | 9 | 8 | 18 | 16 | 19 |
| Properties of electrical storage device | Charge rate (%) | 90 | 91 | 86 | 87 | 92 | 85 | 83 | 90 |
| | Discharge rate (%) | 88 | 90 | 84 | 86 | 91 | 81 | 81 | 85 |

| | | Comparative Example 1 | Comparative Example 2 | Example 9 | Example 10 | Example 11 | Comparative Example 3 | Comparative Example 4 |
|---|---|---|---|---|---|---|---|---|
| Component (A) | Polymer particles | Fluorine-containing polymer particles | | Diene polymer particles | | | | |
| | VDF (parts by mass) | 21 | 20 | — | — | — | — | — |
| | HFP (parts by mass) | 4 | 5 | — | — | — | — | — |
| | TFEMA (parts by mass) | — | — | — | — | — | — | — |
| | TFEA (parts by mass) | — | — | — | — | — | — | — |
| | HFIPA (parts by mass) | — | — | — | — | — | — | — |
| | MMA (parts by mass) | 30 | 30 | 12 | 12 | 12 | 12 | 12 |
| | EHA (parts by mass) | 40 | 40 | — | — | — | — | — |
| | HEMA (parts by mass) | — | — | — | — | 3 | — | 3 |
| | MAA (parts by mass) | 5 | — | — | — | — | — | — |
| | AA (parts by mass) | — | 5 | 1 | 1 | 1 | 1 | 1 |
| | TA (parts by mass) | — | — | 3 | 3 | 3 | 3 | 3 |
| | DVB (parts by mass) | — | — | — | — | — | — | — |
| | TMPTMA (parts by mass) | — | — | — | — | — | — | — |
| | AN (parts by mass) | — | — | 12 | 12 | 12 | 12 | 12 |
| | BD (parts by mass) | — | — | 49 | 49 | 49 | 49 | 49 |
| | ST (parts by mass) | — | — | 23 | 23 | 20 | 23 | 20 |
| Component (B) | Styrene (ppm) | 700 | 1 | — | — | — | — | — |
| | alpha-Methylstyrene (ppm) | — | — | 30 | — | — | 750 | 1 |
| | p-Methylstyrene (ppm) | — | — | — | 150 | — | — | — |
| | p-Chlorostyrene (ppm) | — | — | — | — | 250 | — | — |
| Component (C) | | Water | Water | Water | Water | Water | Water | Water |
| Properties of polymer particles | Number average particle size (nm) | 330 | 330 | 200 | 90 | 120 | 200 | 90 |
| | THF insoluble content (%) | 85 | 85 | 90 | 90 | 90 | 90 | 91 |
| | Tg (° C.) | −5 | −5 | −20 | −20 | −20 | −20 | −21 |
| Storage stability of binder composition | Precipitation | Unacceptable | Acceptable | Acceptable | Acceptable | Acceptable | Unacceptable | Acceptable |
| | Freezing temperature (° C.) | −0.1 | −0.9 | −0.7 | −0.6 | −0.9 | −0.1 | −0.7 |
| Properties of slurry | Spinnability (%) | 15 | 45 | 72 | 60 | 75 | 25 | 65 |
| Properties of electrode | Density of active material layer (g/cm³) | 1.8 | 1.6 | 1.5 | 1.5 | 1.5 | 1.5 | 1.5 |
| | Crack rate (%) | 1 | 15 | 0 | 2 | 1 | 0 | 1 |
| Properties of electrical storage device | Charge rate (%) | 40 | 52 | 90 | 88 | 89 | 50 | 62 |
| | Discharge rate (%) | 41 | 50 | 88 | 87 | 87 | 46 | 60 |

TABLE 2

| | | Example 9 | Example 10 | Example 11 | Comparative Example 3 | Comparative Example 4 |
|---|---|---|---|---|---|---|
| First-stage polymerization component | AN (parts) | 0.0 | 0.0 | 0.0 | 0.0 | 0.0 |
| | HEMA (parts) | 0.0 | 0.0 | 0.0 | 0.0 | 0.0 |
| | BD (parts) | 6.7 | 6.7 | 6.7 | 6.7 | 6.7 |
| | ST (parts) | 12.0 | 12.0 | 12.0 | 12.0 | 12.0 |
| | MMA (parts) | 2.6 | 2.6 | 2.6 | 2.6 | 2.6 |
| | AA (parts) | 0.59 | 0.59 | 0.59 | 0.59 | 0.59 |
| | TA (parts) | 2.35 | 2.35 | 2.35 | 2.35 | 2.35 |
| Total | | 24.2 | 24.2 | 24.2 | 24.2 | 24.2 |
| Second-stage | AN (parts) | 12.0 | 12.0 | 12.0 | 12.0 | 12.0 |

TABLE 2-continued

|  |  | Example 9 | Example 10 | Example 11 | Comparative Example 3 | Comparative Example 4 |
|---|---|---|---|---|---|---|
| polymerization component | HEMA (parts) | 0.0 | 0.0 | 3.0 | 0.0 | 3.0 |
|  | BD (parts) | 42.3 | 42.3 | 42.3 | 42.3 | 42.3 |
|  | ST (parts) | 11.0 | 11.0 | 8.0 | 11.0 | 8.0 |
|  | MMA (parts) | 9.6 | 9.6 | 9.6 | 9.6 | 9.6 |
|  | AA (parts) | 0.36 | 0.36 | 0.36 | 0.36 | 0.36 |
|  | TA (parts) | 0.50 | 0.50 | 0.50 | 0.50 | 0.50 |
| Total |  | 75.8 | 75.8 | 75.8 | 75.8 | 75.8 |
| First-stage polymerization component + second-stage polymerization component | AN (parts) | 12.0 | 12.0 | 12.0 | 12.0 | 12.0 |
|  | HEMA (parts) | 0 | 0 | 3.0 | 0 | 3.0 |
|  | BD (parts) | 49.0 | 49.0 | 49.0 | 49.0 | 49.0 |
|  | ST (parts) | 23.0 | 23.0 | 20.0 | 23.0 | 20.0 |
|  | MMA (parts) | 12.2 | 12.2 | 12.2 | 12.2 | 12.2 |
|  | AA (parts) | 0.95 | 0.95 | 0.95 | 0.95 | 0.95 |
|  | TA (parts) | 2.85 | 2.85 | 2.85 | 2.85 | 2.85 |
| Total |  | 100.0 | 100.0 | 100.0 | 100.0 | 100.0 |

The abbreviation of each component shown in Tables 1 and 2 has the following meaning.
VDF: vinylidene fluoride
HFP: hexafluoropropylene
TFEMA: 2,2,2-trifluoroethyl methacrylate
TFEA: 2,2,2-trifluoroethyl acrylate
HFIPA: 1,1,1,3,3,3-hexafluoroisopropyl acrylate
MMA: methyl methacrylate
EHA: 2-ethtylhexyl acrylate
HEMA: 2-hydroxyethyl methacrylate
MAA: methacrylic acid
AA: acrylic acid
TA: itaconic acid
DVB: divinylbenzene
TMPTMA: trimethylolpropane trimethacrylate
AN: acrylonitrile
BD: 1,3-butadiene
ST: styrene As is clear from Table 1, the electrode binder compositions of Examples 1 to 11 exhibited excellent storage stability. The electrode slurry prepared using the electrode binder compositions of Examples 1 to 11 exhibited excellent adhesion between the collector and the electrode active material layer, and produced an electrode that had a low crack rate and exhibited excellent adhesion. The electrical storage device (lithium-ion secondary battery) including the electrode exhibited excellent charge-discharge rate characteristics.

On the other hand, the binder compositions of Comparative Examples 1 to 4 could not produce an electrode exhibiting excellent characteristics, and could not produce an electrical storage device exhibiting excellent charge-discharge rate characteristics. Since the concentration of the component (B) in the binder compositions of Comparative Examples 1 and 3 was too high, the polymer particles (A) aggregated and precipitated, and the storage stability deteriorated.

It is considered that the polymer particles (A) used in Examples 1 to 5 and Comparative Examples 1 and 2 were polymer alloy particles based on the DSC chart.

FIG. 1 illustrates the DSC chart of the polymer particles (A) produced in Example 3. Since the polymer particles of Example 3 were multi-stage polymerized by adding the monomer to the seed particles, it is considered that the polymer particles of Example 3 were polymer particles containing at least two kinds of polymers. As is clear from FIG. 1, the polymer particles of Example 3 had only one Tg instead of two Tg derived from the two kinds of polymers. This suggests that the polymer particles produced in Example 3 were polymer alloy particles.

The invention is not limited to the above embodiments. Various modifications and variations may be made of the above embodiments. The invention includes various other configurations substantially the same as the configurations described in connection with the above embodiments (such as a configuration having the same function, method, and results, or a configuration having the same objective and results). The invention also includes configurations in which an unsubstantial part described in connection with the above embodiments is replaced. The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the above embodiments.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An electrode binder composition that is used to produce an electrode used for an electrical storage device, the binder composition comprising (A) a polymer, (B) a compound represented by a general formula (1), and (C) a liquid medium,
   the polymer (A) being diene polymer particles that include (Mc) a repeating unit derived from a conjugated diene compound, (Md) a repeating unit derived from an aromatic vinyl compound, (Me) a repeating unit derived from a (meth)acrylate compound, and (Mf) a repeating unit derived from an unsaturated carboxylic acid, and
   a concentration of the compound (B) in the binder composition being 5 to 500 ppm,

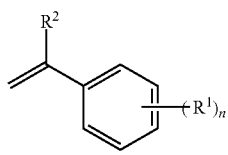

(1)

wherein $R^1$ and $R^2$ independently represent a hydrogen atom, a halogen atom, or a monovalent alkyl group, and n is an integer from 0 to 5.

2. The electrode binder composition according to claim 1, wherein the diene polymer particles have only one endothermic peak within a temperature range of −50 to +5° C. when subjected to differential scanning calorimetry (DSC) in accordance with JIS K 7121.

3. The electrode binder composition according to claim 1, wherein the diene polymer particles have a number average particle size of 50 to 400 nm.

4. An electrode slurry comprising the electrode binder composition according to claim 1, and an electrode active material.

5. An electrode comprising a collector, and a layer that is formed by applying the electrode slurry according to claim 4 to a surface of the collector, and drying the slurry.

6. An electrical storage device comprising the electrode according to claim 5.

* * * * *